United States Patent
Frenne et al.

(10) Patent No.: US 10,172,117 B2
(45) Date of Patent: Jan. 1, 2019

(54) TRANSMITTING AND RECEIVING NODES AND METHODS THEREIN FOR CONTROL CHANNEL TRANSMISSIONS IN A RADIO COMMUNICATIONS NETWORK

(71) Applicant: Telefonaktiebolaget L M Ericsson (Publ), Stockholm (SE)

(72) Inventors: Mattias Frenne, Uppsala (SE); Erik Eriksson, Linköping (SE); Anders Wallén, Ystad (SE); Johan Bergman, Stockholm (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 642 days.

(21) Appl. No.: 14/415,390

(22) PCT Filed: Nov. 13, 2014

(86) PCT No.: PCT/SE2014/051347
§ 371 (c)(1),
(2) Date: Jan. 16, 2015

(87) PCT Pub. No.: WO2015/115957
PCT Pub. Date: Aug. 6, 2015

(65) Prior Publication Data
US 2016/0044649 A1 Feb. 11, 2016

Related U.S. Application Data

(60) Provisional application No. 61/933,899, filed on Jan. 31, 2014.

(51) Int. Cl.
*H04W 72/04* (2009.01)
*H04L 5/00* (2006.01)

(52) U.S. Cl.
CPC ......... *H04W 72/0406* (2013.01); *H04L 5/006* (2013.01); *H04L 5/0053* (2013.01); *H04L 5/0007* (2013.01)

(58) Field of Classification Search
CPC ... H04W 72/0406; H04L 5/0053; H04L 5/006
See application file for complete search history.

(56) References Cited

U.S. PATENT DOCUMENTS

| 2013/0163543 A1* | 6/2013 | Freda | H04W 72/0406 370/329 |
|---|---|---|---|
| 2014/0185540 A1* | 7/2014 | Gaal | H04W 72/042 370/329 |

OTHER PUBLICATIONS

Yonghui Chen, "Resource Allocation for Downlink Control Channel in LTE Systems", 2001.*

(Continued)

*Primary Examiner* — Jackie Zuniga Abad
(74) *Attorney, Agent, or Firm* — Christopher & Weisberg, P.A.

(57) ABSTRACT

Embodiments herein relate to a transmitting node and method therein for transmitting channel information in subframes to a receiving node. Each subframe comprises a number of control channel elements and a set of control channel candidates. The transmitting node transmits control channel information in a subframe when a start control channel element index of a control channel candidate is smaller than or equal to the number of available control channel elements in a predefined subframe, and refrains from transmitting control channel information when the start control channel element index of the control channel candidate is larger than the number of available control channel elements in the predefined subframe. The embodiments also relate to a receiving node and method therein.

26 Claims, 11 Drawing Sheets

(56) References Cited

OTHER PUBLICATIONS

International Search Report and Written Opinion dated Feb. 18, 2015 for International Application No. PCT/SE2014/051347, International Filing Date Nov. 13, 2014 consisting of 11 pages.
LG Electronics: "PDCCH Transmission for MTC Coverage Enhancement," 3GPP Draft; R1-135461, vol. RAN WG1, No. San Francisco,USA, Nov. 11-15, 2013, consisting of 6 pages.
Huawei et al: "Discussion on (E) PDCCH and PUCCH Coverage Improvement for MTC UEs," 3GPP Draft; R1-135021, vol. RAN WG1, No. San Francisco,USA, Nov. 11-15, 2013, consisting of 6 pages.
Ericsson: "On PDCCH/EPDCCH Mapping for Enhanced Coverage MTC UE," 3GPP Draft; R1-140744, vol. RAN WG1, No. Prague, Czech Republic, Feb. 10-14, 2014, consisting of 5-pages.

* cited by examiner

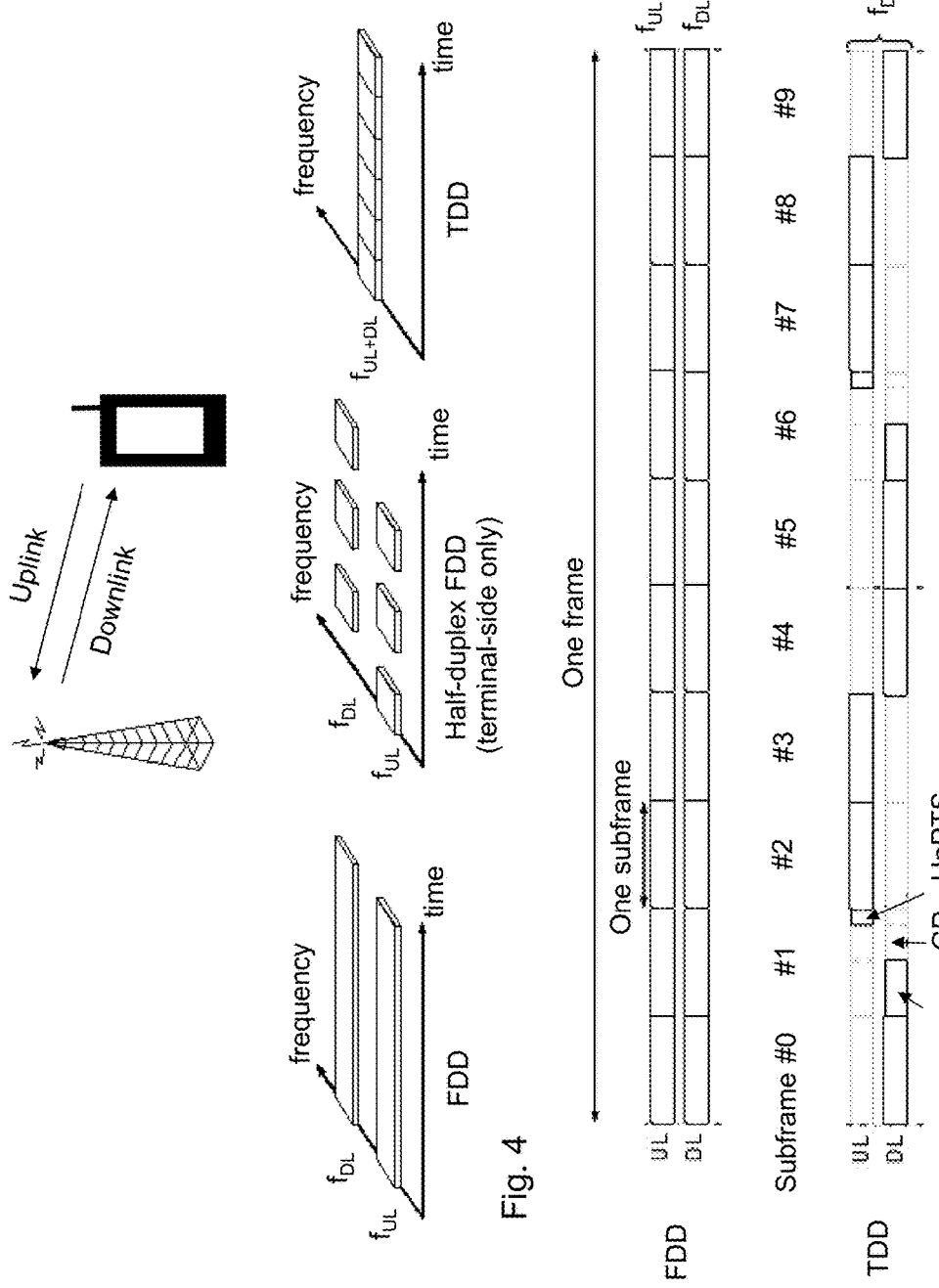

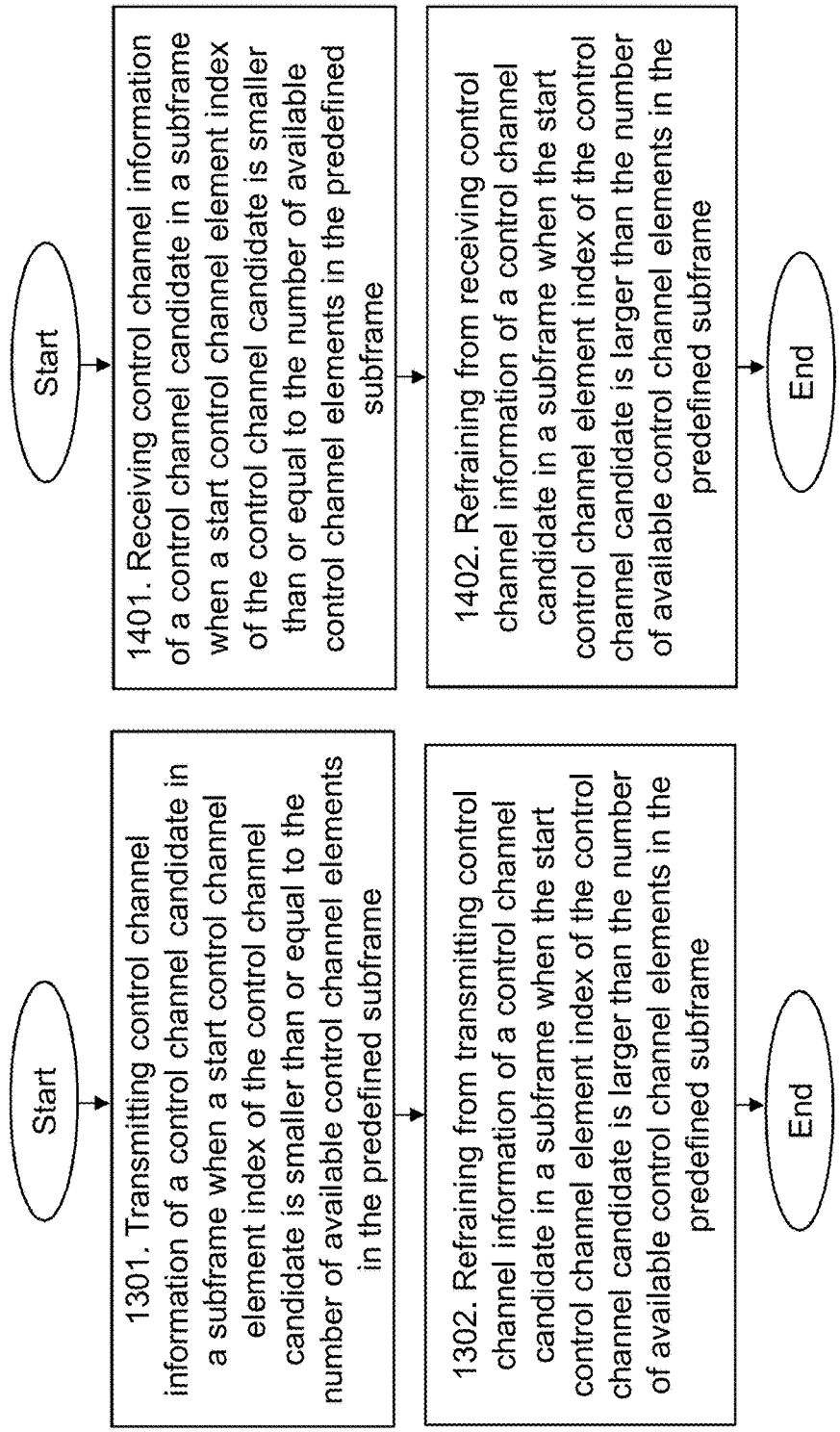

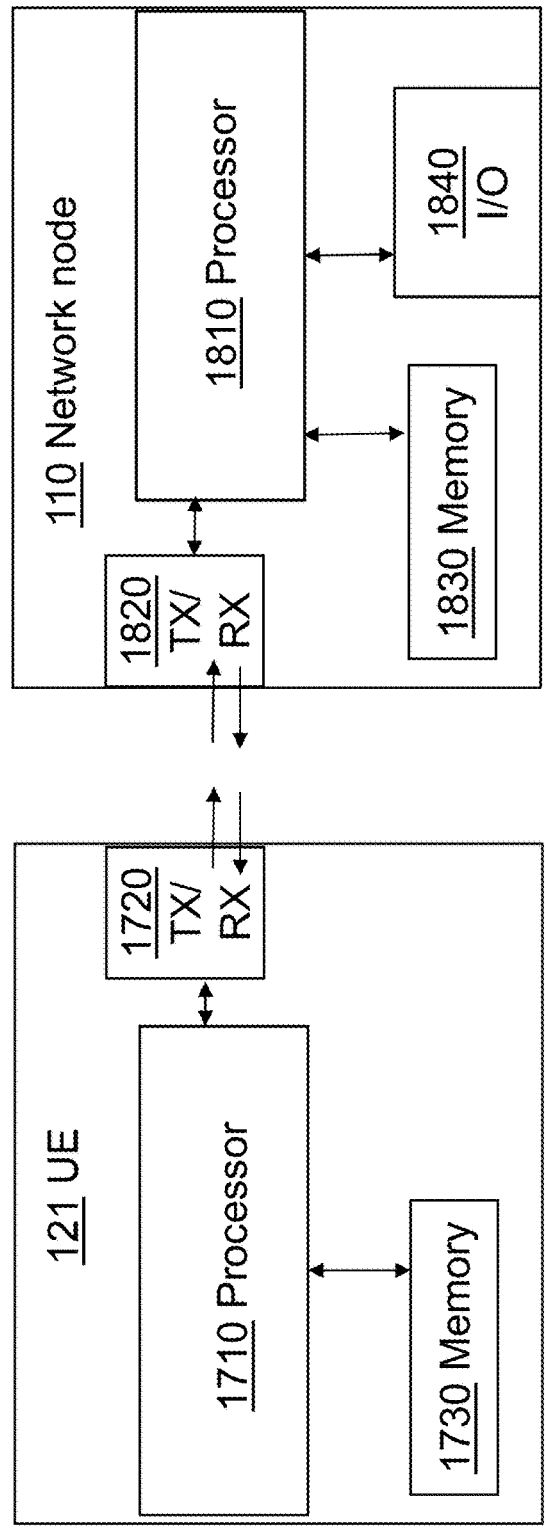

TRANSMITTING AND RECEIVING NODES AND METHODS THEREIN FOR CONTROL CHANNEL TRANSMISSIONS IN A RADIO COMMUNICATIONS NETWORK

TECHNICAL FIELD

Embodiments herein relate to control channel transmissions in a radio communications network. In particular, embodiments herein relate to transmitting and receiving nodes, and methods therein, for transmitting/receiving control channel information in a radio communications network.

BACKGROUND

In a typical radio communications network, wireless terminals, also known as mobile stations, terminals and/or user equipments, UEs, communicate via a Radio Access Network, RAN, to one or more core networks. The radio access network covers a geographical area which is divided into cell areas, with each cell area being served by a base station, e.g. a radio base station, RBS, which in some networks may also be called, for example, a "NodeB" or "eNodeB". A cell is a geographical area where radio coverage is provided by the radio base station at a base station site or an antenna site in case the antenna and the radio base station are not collocated. Each cell is identified by an identity within the local radio area, which is broadcast in the cell. Another identity identifying the cell uniquely in the whole mobile network is also broadcasted in the cell. One base station may have one or more cells. A cell may be downlink and/or uplink cell. The base stations communicate over the air interface operating on radio frequencies with the user equipments within range of the base stations.

A Universal Mobile Telecommunications System, UMTS, is a third generation mobile communication system, which evolved from the second generation, 2G, Global System for Mobile Communications, GSM. The UMTS terrestrial radio access network, UTRAN, is essentially a RAN using wideband code division multiple access, WCDMA, and/or High Speed Packet Access, HSPA, for user equipments. In a forum known as the Third Generation Partnership Project, 3GPP, telecommunications suppliers propose and agree upon standards for third generation networks and UTRAN specifically, and investigate enhanced data rate and radio capacity. In some versions of the RAN as e.g. in UMTS, several base stations may be connected, e.g., by landlines or microwave, to a controller node, such as a radio network controller, RNC, or a base station controller, BSC, which supervises and coordinates various activities of the plural base stations connected thereto. The RNCs are typically connected to one or more core networks.

Specifications for the Evolved Packet System, EPS, have been completed within the 3$^{rd}$ Generation Partnership Project, 3GPP, and this work continues in the coming 3GPP releases. The EPS comprises the Evolved Universal Terrestrial Radio Access Network, E-UTRAN, also known as the Long Term Evolution, LTE, radio access, and the Evolved Packet Core, EPC, also known as System Architecture Evolution, SAE, core network. E-UTRAN/LTE is a variant of a 3GPP radio access technology wherein the radio base station nodes are directly connected to the EPC core network rather than to RNCs. In general, in E-UTRAN/LTE the functions of a RNC are distributed between the radio base stations nodes, e.g. eNodeBs in LTE, and the core network. As such, the Radio Access Network, RAN, of an EPS has an essentially "flat" architecture comprising radio base station nodes without reporting to RNCs.

LTE uses OFDM in the downlink and DFT-spread OFDM in the uplink. The basic LTE physical resource may thus be seen as a time-frequency grid as illustrated in FIG. 1. FIG. 1 shows an example of a LTE downlink physical resource.

Here, each resource element corresponds to one subcarrier during one OFDM symbol interval, i.e. an interval on a particular antenna port. An antenna port is defined such that the channel over which a symbol on the antenna port is conveyed may be inferred from the channel over which another symbol on the same antenna port is conveyed. There is one resource grid per antenna port.

In the time domain, LTE downlink transmissions are organized into radio frames of 10 ms, each radio frame consisting of ten equally-sized subframes of 1 ms as illustrated in FIG. 2. FIG. 2 shows an example of a LTE time-domain structure. A subframe is divided into two slots, each of 0.5 ms time duration.

The resource allocation in LTE is described in terms of resource blocks, where a resource block corresponds to one slot in the time domain and 12 contiguous 15 kHz subcarriers in the frequency domain. Two in time consecutive resource blocks represent a resource block pair and corresponds to the time interval upon which scheduling operates.

Transmissions in LTE are dynamically scheduled in each subframe where the base station transmits downlink assignments/uplink grants to certain UEs via the physical downlink control channel or the enhanced physical downlink control channel (PDCCH and EPDCCH). The PDCCHs are transmitted in the first OFDM symbol(s) in each subframe and spans (more or less) the whole system bandwidth. A UE that has decoded a downlink assignment, carried by a PDCCH, knows which resource elements in the subframe that contain data aimed for the UE. Similarly, upon receiving an uplink grant, the UE knows which time/frequency resources it should transmit upon in uplink. In LTE downlink, data is carried by the physical downlink shared data link (PDSCH) and in the uplink the corresponding link is referred to as the physical uplink shared link (PUSCH).

The use of and enhanced downlink control signaling (EPDCCH) is available for terminals of Release 11 or later. Such control signaling has similar functionalities as PDCCH; with the fundamental differences of requiring UE specific DMRS instead of CRS for its demodulation and that the EPDCCH does only use a fraction of the system bandwidth which allows for interference coordination with other cells. One additional advantage is that UE specific spatial processing such as beamforming may be exploited for EPDCCH.

Demodulation of sent data requires estimation of the radio channel which is done by using transmitted reference symbols, RS, i.e. symbols known by the receiver. In LTE, cell specific reference symbols, CRS, are transmitted in all downlink subframes and in addition to assist downlink channel estimation they are also used for mobility measurements performed by the UEs. LTE also supports UE specific RS aimed only for assisting channel estimation for demodulation purposes.

FIG. 3 illustrates how the mapping of physical control/data channels and signals can be done on resource elements within a downlink subframe. More specifically, FIG. 1 shows an example of a mapping of LTE physical control signalling, data link and cell specific reference signals within a downlink subframe. In this example, the PDCCHs occupy the first out of three possible OFDM symbols, so in this particular case the mapping of data could start already at the second OFDM symbol. Since the CRS is common to all UEs in the cell, the transmission of CRS cannot be easily adapted to suit the needs of a particular UE. This is in contrast to UE specific RS which means that each UE has RS of its own placed in the data region of part of PDSCH or EPDCCH.

The length of the control region, which can vary on subframe basis, is conveyed in the Physical Control Format Indicator, PCFICH. The PCFICH is transmitted within control region, at locations known by terminals. After a terminal has decoded the PCFICH, it thus knows the size of the control region and in which OFDM symbol the data transmission starts. Also transmitted in the control region is the Physical Hybrid-ARQ Indicator, which carries ACK/NACK responses to a terminal to inform if the uplink data transmission in a previous subframe was successfully decoded by the base station or not.

As previously indicated, CRS are not the only reference symbols available in LTE. As of LTE Release-10, a new RS concept was introduced with separate UE specific RS for demodulation of PDSCH and EPDCCH and RS for measuring the channel for the purpose of channel state information (CSI) feedback from the UE. The latter is referred to as CSI-RS. CSI-RS are not transmitted in every subframe and they are generally sparser in time and frequency than RS used for demodulation. CSI-RS transmissions may occur every $5^{th}$, $10^{th}$, $20^{th}$, $40^{th}$, or $80^{th}$ subframe according to an RRC configured periodicity parameter and an RRC configured subframe offset.

Time Division Duplex

Transmission and reception from a node, e.g. a terminal in a cellular system such as LTE, can be multiplexed in the frequency domain or in the time domain, or combinations thereof.

FIG. 4 shows an illustration of frequency- and time-division duplex. Frequency Division Duplex, FDD, as illustrated to the left in FIG. 4, implies that downlink and uplink transmission take place in different, sufficiently separated, frequency bands. Time Division Duplex, TDD, as illustrated to the right in FIG. 4, implies that downlink and uplink transmission take place in different, non-overlapping time slots. Thus, TDD can operate in unpaired spectrum, whereas FDD requires paired spectrum.

Typically, the structure of the transmitted signal in a communication system is organized in the form of a frame structure. For example, LTE uses ten equally-sized subframes of length 1 ms per radio frame as illustrated in FIG. 5. FIG. 5 shows an example of an uplink/downlink time/frequency structure for LTE in case of FDD and TDD.

In case of FDD operation, i.e. upper part of FIG. 5, there are two carrier frequencies, one for uplink transmission, $f_{UL}$, and one for downlink transmission, $f_{DL}$. At least with respect to the terminal in a cellular communication system, FDD may be either full duplex or half duplex. In the full duplex case, a terminal may transmit and receive simultaneously, while in half-duplex operation, the terminal may not transmit and receive simultaneously. However, in the latter case, the base station is capable of simultaneous reception/transmission though, e.g. receiving from one terminal while simultaneously transmitting to another terminal. In LTE, a half-duplex terminal is monitoring/receiving in the downlink except when explicitly being instructed to transmit in a certain subframe.

In case of TDD operation, i.e. lower part of FIG. 5, there is only a single carrier frequency and uplink and downlink transmissions are always separated in time also on a cell basis. As the same carrier frequency is used for uplink and downlink transmission, both the base station and the mobile terminals need to switch from transmission to reception and vice versa. According to an aspect of any TDD system is to provide the possibility for a sufficiently large guard time where neither downlink nor uplink transmissions occur. This is required to avoid interference between uplink and downlink transmissions. For LTE, this guard time is provided by special subframes, e.g. subframe 1 and, in some cases, subframe 6, which are split into three parts: a downlink part, DwPTS, a guard period, GP, and an uplink part, UpPTS. The remaining subframes are either allocated to uplink or downlink transmission.

TDD allows for different asymmetries in terms of the amount of resources allocated for uplink and downlink transmission, respectively, by means of different downlink/uplink configurations. In LTE, there are seven different configurations as shown in FIG. 6. FIG. 6 shows an example of different downlink/uplink configurations in case of TDD. Note that in the description below, DL subframe can mean either DL or the special subframe.

Currently there are 9 special subframe configurations defined for normal CP and 7 defined for extended CP, with different length of downlink pilot time slot, DwPTS, Guard Period, GP, and uplink pilot time slot, UpPTS. For normal CP, EPDCCH and PDSCH transmission is not supported for DwPTS spanning 3 OFDM symbols, i.e. configuration 0 and configuration 5. EPDCCH and PDSCH transmission is supported for all the remaining configurations with DwPTS spanning 9~11 OFDM symbols.

To avoid severe interference between downlink and uplink transmissions between different cells, neighbor cells should have the same downlink/uplink configuration. If this is not done, uplink transmission in one cell may interfere with downlink transmission in the neighboring cell, and vice versa, as illustrated in FIG. 7. FIG. 7 shows an example of downlink/uplink interference in TDD. Hence, the downlink/uplink asymmetry can typically not vary between cells, but is signaled as part of the system information and remains fixed for a long period of time.

Enhanced Control Signaling in LTE

Messages transmitted over the radio link to users can be broadly classified as control messages or data messages. Control messages are used to facilitate the proper operation of the system as well as proper operation of each UE within the system. Control messages could include commands to control functions such as the transmitted power from a UE, signaling of RBs within which the data is to be received by the UE or transmitted from the UE and so on.

In Rel-8, the first one to four OFDM symbols, depending on the configuration, in a subframe is reserved to contain such control information, see e.g. FIG. 3. Furthermore, in Rel-11, an enhanced control channel was introduced, EPDCCH, in which PRB pairs are reserved to exclusively contain EPDCCH transmissions, although excluding from the PRB pair the one to four first symbols that may contain control information to UEs of releases earlier than Rel-11. This is illustrated in FIG. 8.

In FIG. 8, the downlink subframe shows 10 RB pairs and configuration of three EPDCCH regions, i.e. red, green, and blue, of size 1 PRB pair each. The remaining PRB pairs may be used for PDSCH transmissions.

Hence, the EPDCCH is frequency multiplexed with PDSCH transmissions contrary to PDCCH which is time multiplexed with PDSCH transmissions. Note also that multiplexing of PDSCH and any EPDCCH transmission within a PRB pair is not supported in LTE Rel-11. A UE may be configured to monitor the EPDCCH in one or two sets of RB pairs and the RB belonging to each set is independently configured by RRC signaling.

The PDCCHs and EPDCCHs are transmitted over radio resources that are shared between several UEs. Each PDCCH consists of smaller parts, known as control channel elements, CCEs, to enable link adaptation, e.g. by controlling the number of CCE a PDCCH is utilizing. It is specified that for PDCCH, a UE has to monitor 4 aggregation levels of CCEs, namely, 1, 2, 4, and 8, for UE-specific search space and 2 aggregation levels of CCEs, namely, 4 and 8, for common search space.

According to one example, a search space $S_k^{(L)}$ at aggregation level $L \in \{1,2,4,8\}$ is defined by a contiguous set of CCEs given by:

$$(Z_k^{(L)} + i) \bmod N_{CCE,k}$$

where $N_{CCE,k}$ is the total number of CCEs in the control region of subframe k, $Z_k^{(L)}$ defines the start of the search space, $i = 0, 1, \ldots, M^{(L)} \cdot L - 1$, and $M^{(L)}$ is the number of PDCCHs to monitor in the given search space. Each CCE contains 36 QPSK modulation symbols.

Here, it may be noted that $N_{CCE,k}$ is dependent on the subframe index k. This because the number of control OFDM symbols, i.e. 1, 2, 3 or 4, may change from subframe to subframe. In addition, the number of physical HARQ indicator channels, PHICH, may also change from subframe to subframe in TDD.

The value of $M^{(L)}$, for example, be specified by Table 1, as shown below:

TABLE 1

$M^{(L)}$ vs. Aggregation Level L for PDCCH

| Type | Search space $S_k^{(L)}$ Aggregation level L | Size [in CCEs] | Number of PDCCH candidates $M^{(L)}$ |
|---|---|---|---|
| UE-specific | 1 | 6 | 6 |
| | 2 | 12 | 6 |
| | 4 | 8 | 2 |
| | 8 | 16 | 2 |
| Common | 4 | 16 | 4 |
| | 8 | 16 | 2 |

With this definition, search space for different aggregation levels may overlap with each other regardless of system bandwidth. More specifically, UE-specific search space and common search space might overlap and the search spaces for different aggregation levels might overlap.

One example is shown below in Table 2 where there are 9 CCEs in total and very frequent overlap between PDCCH candidates:

TABLE 2

$N_{CCE,k} = 9$, $Z_k^{(L)} = \{1, 6, 4, 0\}$ for $L = \{1, 2, 4, 8\}$, respectively.

Search space $S_k(L)$

| Type | Aggregation Level L | PDCCH candidates in terms of CCE index |
|---|---|---|
| UE-Specific | 1 | {1}, {2}, {3}, {4}, {5}, {6} |
| | 2 | {6, 7}, {8, 0}, {1, 2}, {3, 4}, {5, 6}, {7, 8} |
| | 4 | {4, 5, 6, 7}, {8, 0, 1, 2} |
| | 8 | {0, 1, 2, 3, 4, 5, 6, 7}, {8, 0, 1, 2, 3, 4, 5, 6} |

TABLE 2-continued $N_{CCE,k} = 9$, $Z_k^{(L)} = \{1, 6, 4, 0\}$ for $L = \{1, 2, 4, 8\}$, respectively.

Search space $S_k(L)$

| Type | Aggregation Level L | PDCCH candidates in terms of CCE index |
|---|---|---|
| Common | 4 | {0, 1, 2, 3}, {4, 5, 6, 7}, {8, 0, 1, 2}, {3, 4, 5, 6} |
| | 8 | {0, 1, 2, 3, 4, 5, 6, 7}, {8, 0, 1, 2, 3, 4, 5, 6} |

Similar as for PDCCH, the EPDCCH is transmitted over radio resources shared by multiple UEs and enhanced CCE (ECCE) is introduced as the equivalent to CCE for PDCCH. An ECCE has also a fixed number of RE but the number of RE available for EPDCCH mapping is generally fewer than this fixed number because many RE are occupied by other signals such as CRS and in some subframes CSI-RS. Code chain rate matching is applied whenever a RE belonging to a ECCE contains other colliding signals such as the CRS, CSI-RS, legacy control region or in case of TDD, the GP and UpPTS.

Note also in this case that the number of ECCE per EPDCCH set p, denoted $N_{ECCE,p,k}$ is dependent on the subframe index k. This is due to the fact that under some circumstances, as in TDD special subframes and/or in subframes with extended CP, the number of ECCEs is generally fewer.

In addition, the search space for EPDCCH, denoted $ES_k^{(L)}$ has a larger set of aggregation levels than PDCCH, namely $L \in \{1,2,4,8,16,32\}$, see section 9.1.4 in 3GPP TS 36.213. But, in a given subframe not all six aggregation levels are available, at most five are, and commonly only four. So the set of aggregation levels also varies from subframe to subframe, depending on the varying overhead of other signals such as CSI-RS and the legacy control region size, i.e. 1, 2, 3 or 4 OFDM symbols, comprising PDCCH, PCFICH and PHICH.

In Rel-11, the EPDCCH supports only the UE specific search space whereas the common search space remains to be monitored in the PDCCH in the same subframe. In future releases, the common search space may be introduced also for EPDCCH transmission.

As mention above, it is specified that the UE monitors ECCE aggregation levels 1, 2, 4, 8, 16 and 32 with restrictions, shown in Table 4, where $n_{EPDCCH}$ is the number of available RE for EPDCCH transmission in a PRB pair. In Table 4, distributed and localized transmission refers to the EPDCCH mapping to resource elements.

In distributed transmission, an EPDCCH is mapped to resource elements in up to D PRB pairs, where D=2, 4, or 8. However, it may be noted that the value of D=16 is also being considered in 3GPP. In this way can frequency diversity be achieved for the EPDCCH message.

FIG. 9 shows a schematic example wherein downlink subframe showing 4 parts belonging to an EPDCCH is mapped to multiple of the enhanced control regions known as PRB pairs, to achieve distributed transmission and frequency diversity or subband precoding.

In localized transmission, an EPDCCH is mapped to one PRB pair only, if the space allows, which e.g. is always possible for aggregation level one and two and for normal subframes and normal CP length also for level four. In case the aggregation level of the EPDCCH is too large, a second PRB pair is used as well, and so on, using more PRB pairs, until all ECCE belonging to the EPDCCH has been mapped. The number ECCE that fit into one PRB pair is given by Table 3 below:

TABLE 3

| Normal cyclic prefix | | | Extended cyclic prefix | |
|---|---|---|---|---|
| Normal subframe | Special subframe, configuration 3, 4, 8 | Special subframe, configuration 1, 2, 6, 7, 9 | Normal subframe | Special subframe, configuration 1, 2, 3, 5, 6 |
| 4 | 4 | 2 | 2 | 2 |

Table 3 shows the number ECCE that fit into one PRB pair, i.e. the number of ECCE per PRB pair. Note that special subframe 0 and 5 for normal CP and 0 and 4 for extended CP are missing from the table, since in these subframes EPDCCH is not supported at all, i.e. zero ECCEs.

FIG. 10 shows an illustration of localized transmission. More specifically, FIG. 10 illustrates a downlink subframe showing the 4 ECCEs belonging to an EPDCCH is mapped to one of the enhanced control regions, to achieve localized transmission.

As an example, in normal subframe and with normal CP length and with $n_{EPDCCH} \geq 104$, localized transmission is using aggregation levels (1,2,4,8) and they are mapped to (1,1,1,2) PRB pairs respectively.

To facilitate the mapping of ECCEs to physical resources each PRB pair is divided into 16 enhanced resource element groups, EREGs, and each ECCE is split into 4 or 8 eREGs for normal and extended cyclic prefix, respectively. An EPDCCH is consequently mapped to a multiple of four or eight EREGs depending on the aggregation level. These EREG belonging to an EPDCCH resides in either a single PRB pair, as is typical for localized transmission, or a multiple of PRB pairs, as is typical for distributed transmission.

One example of an exact division of a PRB pair with normal CP and normal subframe into EREG is illustrated in FIG. 11. FIG. 11 shows a PRB pair of normal cyclic prefix configuration in a normal subframe. Each tile is a resource element where the number corresponds to the eREG it is grouped within. The dashed areas correspond to the first eREG indexed with 0. Furthermore, it is specified in 3GPP TS 36.211 how the 4 or 8 EREGs respectively are grouped into the ECCEs. Table 4 shows aggregation levels for EPDCCH.

TABLE 4

| | Aggregation levels | | | |
|---|---|---|---|---|
| | Normal subframes and special subframes, configuration 3, 4, 8, with $n_{EPDCCH}$ < 104 and using normal cyclic prefix | | All other cases | |
| EPDCCH format | Localized transmission | Distributed transmission | Localized transmission | Distributed transmission |
| 0 | 2 | 2 | 1 | 1 |
| 1 | 4 | 4 | 2 | 2 |
| 2 | 8 | 8 | 4 | 4 |
| 3 | 16 | 16 | 8 | 8 |
| 4 | — | 32 | — | 16 |

Mapping of EPDCCH to RE

Each EPDCCH comprises of AL ECCEs, where AL is the aggregation level of the message. Each ECCE in turn consists of L EREG, where L=4 or L=8. An EREG is a group of RE which are defined in 3GPP specification TS 36.211. In each PRB pair there are 16 EREG.

When EPDCCH collides in mapping with other signals such as own cell CRS or own cell legacy control region, the other signals have priority and EPDCCH is mapped around these occupied REs and code chain rate matching is applied. This means that the effective number of available RE per EREG is usually less than the 9 RE but there is no interference from these colliding signals introduced in the decoding since the EPDCCH is mapped around those.

Work is ongoing in 3GPP to enhance the coverage for machine type communication (MTC) devices, a special category of UEs, and to achieve in the order of 15-20 dB coverage enhancements in LTE multiple physical channels and physical signals will need to be improved. Since the required improvements are so large, i.e. 20 dB coverage improvements is equivalent to operation at 100 times lower signal-to-noise ratio, and LTE is already very good, i.e. there is no known flaw in LTE that can provide improvements anywhere near 100 times, it is likely that plain old repetition will provide most of the required coverage improvements. However, current LTE signals cannot easily just be repeated approximately 100 times, for example, due to timing constraints during connection setup and other procedures, so new signals may need to be defined for this purpose.

According to the above, there is a need to improve the radio coverage of a control channel when using repeated control channel transmissions in a radio communications network.

In a document R1-135461 entitled—"PDCCH transmission for MTC coverage enhancement", a method for PDCCH coverage enhancement is outlined, where a PDCCH transmission is repeated, beginning at a start subframe and comprising a number of subsequent subframes. One simple option is to use same PDCCH candidate index during a PDCCH repetition. Then, an UE may assume that PDCCH candidate index of repeated PDCCHs are same with that of first PDCCH in a bundle. It allows the same UE blind decoding complexity and makes simple UE behavior, and additional signaling is not required.

SUMMARY

It is an object of embodiments herein to improve the radio coverage of a control channel when using repeated control channel transmissions in a radio communications network.

According to a first aspect of embodiments herein, the object is achieved by a method performed by a transmitting node for transmitting control channel information repeatedly in a number of subframes to a receiving node in a radio communication network. Each subframe comprises a number of available control channel elements and a set of control channel candidates. Each set of control channel candidates is defined by a set of control channel candidates in a predefined subframe comprising a number of available control channel elements. The transmitting node transmits control channel information of a control channel candidate in a subframe when a start control channel element index of the control channel candidate is smaller than or equal to the number of available control channel elements in the predefined subframe. Also, the transmitting node refrains from transmitting control channel information of a control channel candidate in a subframe when the start control channel element index of the control channel candidate is larger than the number of available control channel elements in the predefined subframe.

According to a second aspect of embodiments herein, the object is achieved by a transmitting node for transmitting control channel information repeatedly in a number of subframes to a receiving node in a radio communication network. Each subframe comprises a number of available control channel elements and a set of control channel candidates. Each set of control channel candidates is defined by a set of control channel candidates in a predefined subframe comprising a number of available control channel elements. The transmitting node comprises a transmitter being configured to transmit control channel information of a control channel candidate in a subframe when a start control channel element index of the control channel candidate is smaller than or equal to the number of available control channel elements, in the predefined subframe. The transmitter is further configured to refrain from transmitting control channel information of a control channel candidate in a subframe when the start control channel element index of the control channel candidate is larger than the number of available control channel elements in the predefined subframe.

According to a third aspect of embodiments herein, the object is achieved by a method performed by a receiving node for receiving control channel information repeatedly in a number of subframes from a transmitting node in a radio communication network. Each subframe comprises a number of available control channel elements and a set of control channel candidates. Each set of control channel candidates is defined by a set of control channel candidates in a predefined subframe comprising a number of available control channel elements. The transmitting node receives control channel information of a control channel candidate in a subframe when a start control channel element index of the control channel candidate is smaller than or equal to the number of available control channel elements in the predefined subframe. The transmitting node also refrains from receiving control channel information of a control channel candidate in a subframe when the start control channel element index of the control channel candidate is larger than the number of available control channel elements in the predefined subframe.

According to a fourth aspect of embodiments herein, the object is achieved by a receiving node for receiving control channel information repeatedly in a number of subframes from a transmitting node in a radio communication network. Each subframe comprises a number of available control channel elements and a set of control channel candidates. Each set of control channel candidates is defined by a set of control channel candidates in a predefined subframe comprising a number of available control channel elements. The receiving node comprises a receiver being configured to receive control channel information of a control channel candidate in a subframe when a start control channel element index of the control channel candidate is smaller than or equal to the number of available control channel elements, in the predefined subframe. The receiver is further configured to refrain from receiving control channel information of a control channel candidate in a subframe when the start control channel element index of the control channel candidate is larger than the number of available control channel elements in the predefined subframe.

An advantage of embodiments herein is that the radio coverage of a control channel when using repeated control channel transmissions in a radio communications network is improved, that is, the coverage of a control channel transmitted with repetition is extended.

BRIEF DESCRIPTION OF THE DRAWINGS

Embodiments will now be described in more detail in relation to the enclosed drawings.

FIG. 4 is an illustration of FDD and TDD

FIG. 5 is an illustration of an example of an UL/DL time/frequency structure in case of FDD and TDD, FIG. 13 is a flowchart depicting embodiments of a method in a transmitting node, FIG. 14 is a flowchart depicting embodiments of a method in a receiving node, FIG. 17 is a schematic block diagram depicting embodiments of a transmitting node and/or a receiving node, FIG. 18 is a schematic block diagram depicting embodiments of a transmitting node and/or a receiving node.

DETAILED DESCRIPTION

Figure 1:
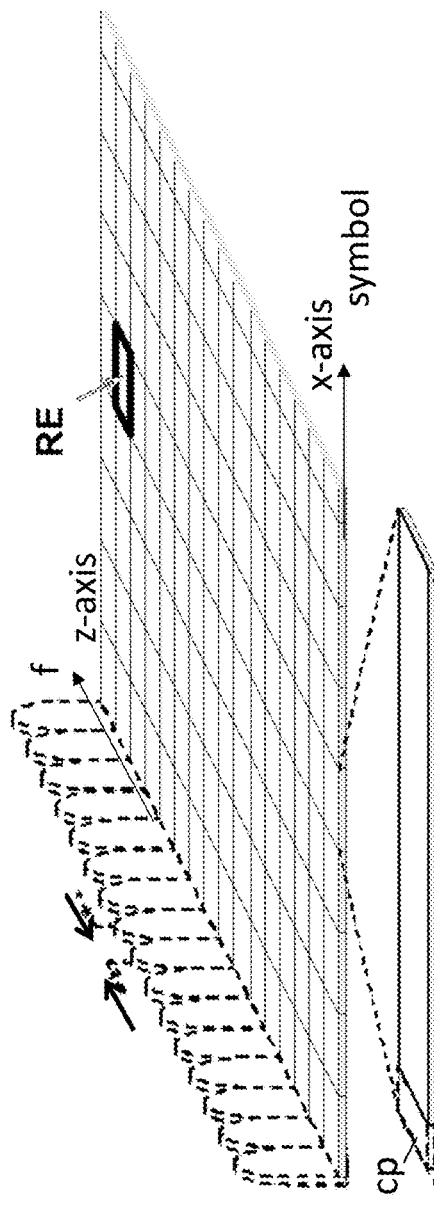
FIG. 1 is a schematic block diagram of a LTE downlink physical resource.
Figure 2:
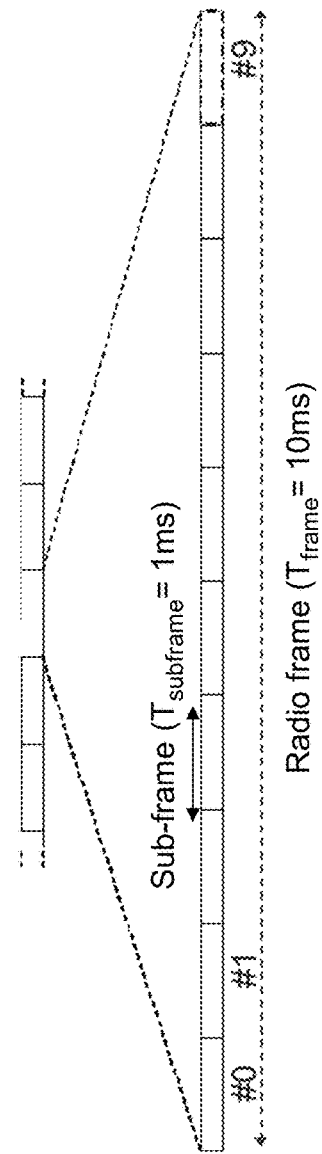
FIG. 2 is a schematic overview depicting radio frames.
Figure 3:
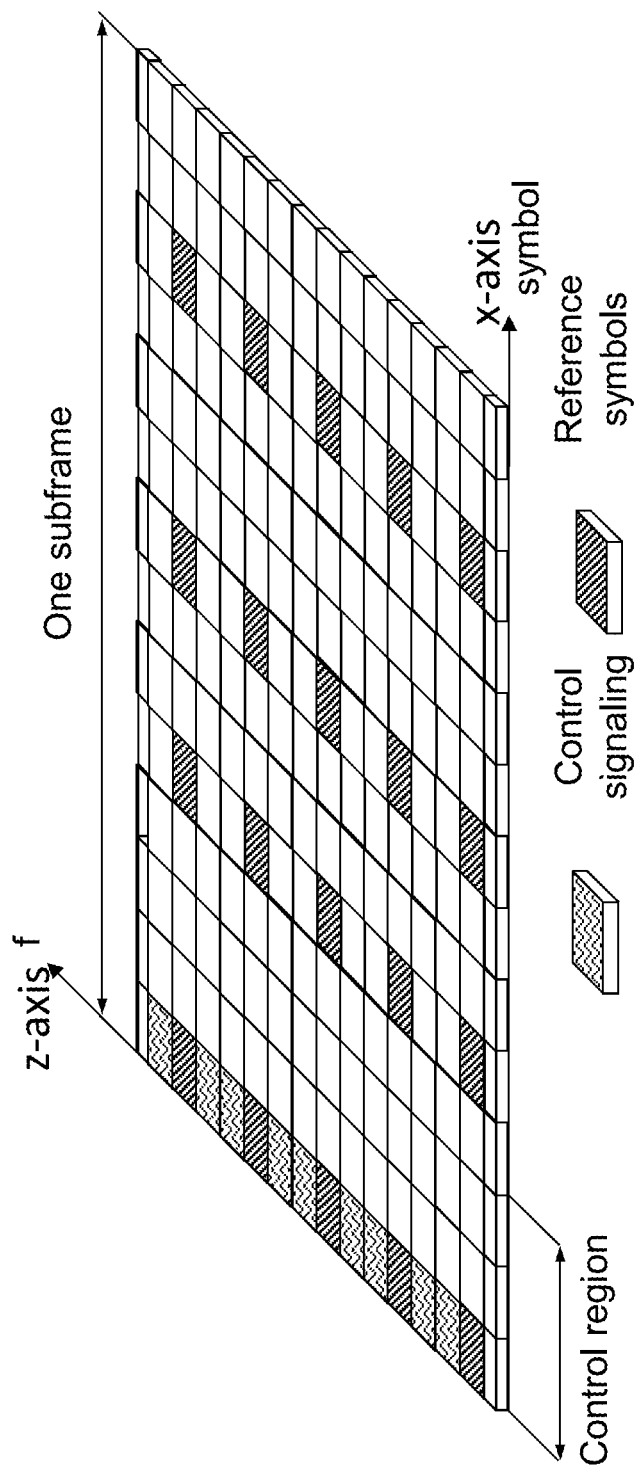
FIG. 3 is a schematic overview depicting a DL subframe.
Figure 6:
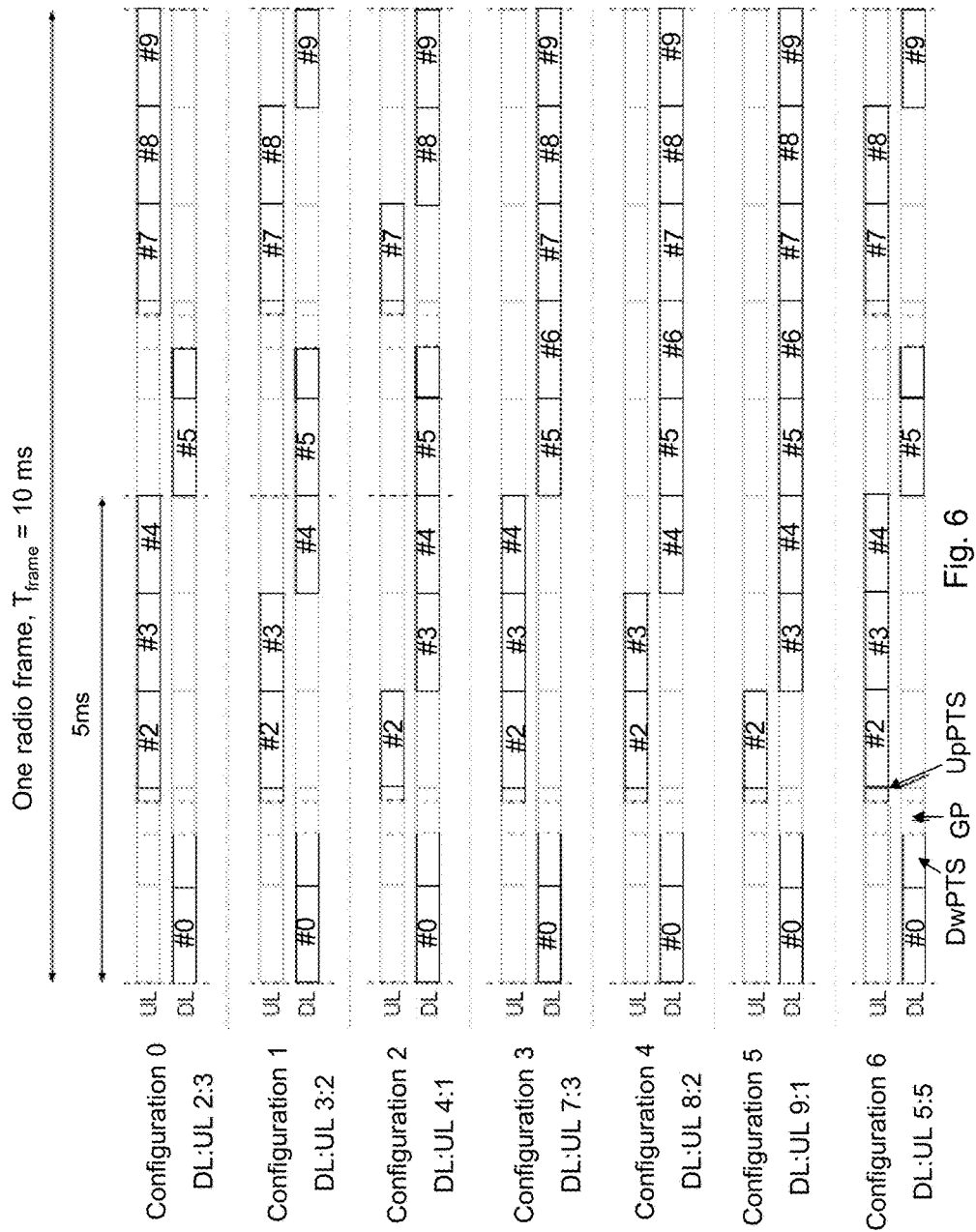
FIG. 6 is an illustration of an example of different DL/UL configurations in case of TDD.
Figure 7:
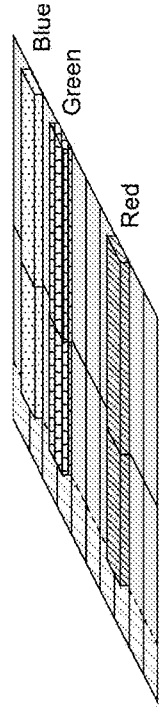
FIG. 7 is an illustration of an example of a DL/UL interference in TDD.
Figure 8:
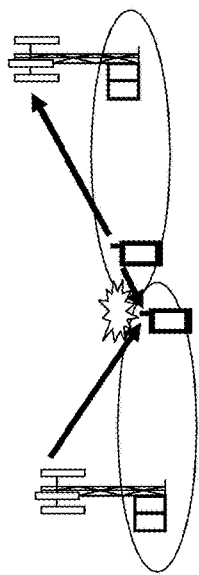
FIG. 8 is a schematic block diagram illustrating enhanced control channel.
Figure 9:
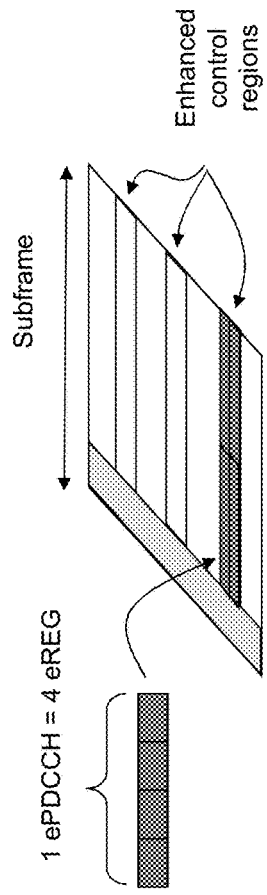
FIG. 9 is a schematic block diagram illustrating enhanced control regions of an enhanced control channel.
Figure 10:
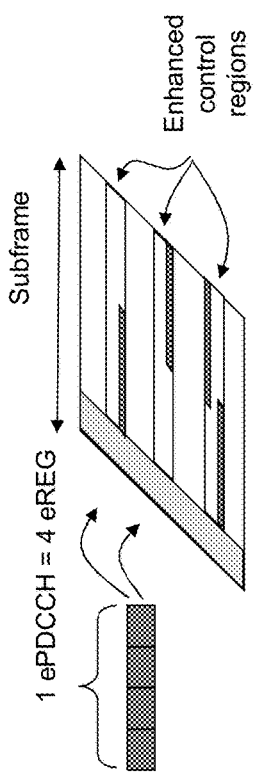
FIG. 10 is a schematic block diagram illustrating a localized transmission of an enhanced control channel.
Figure 11:
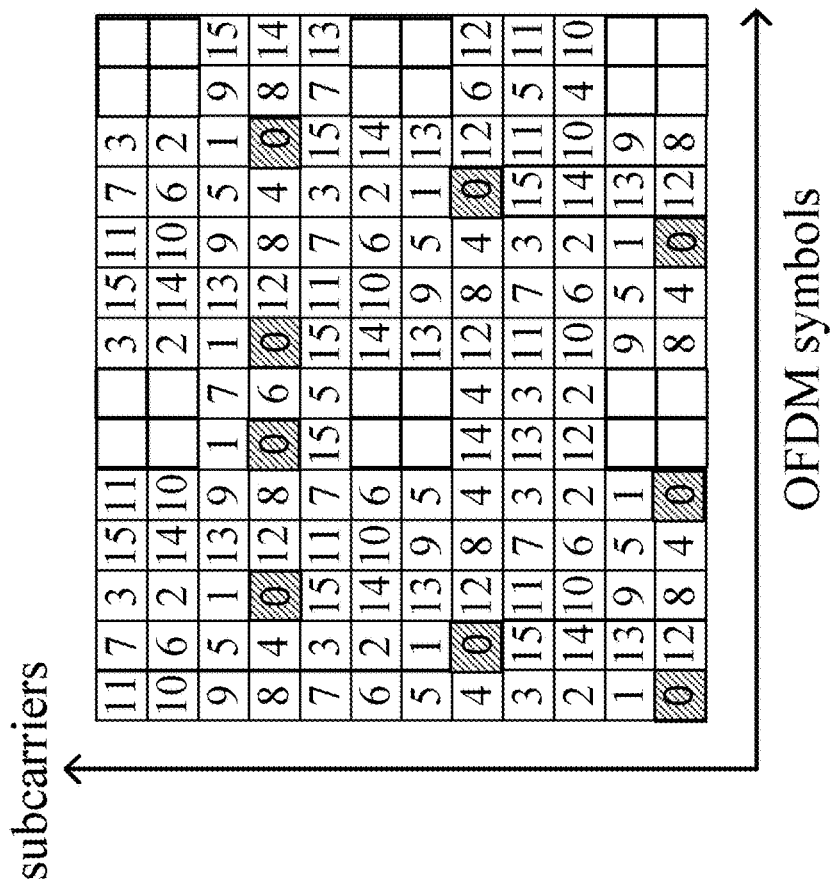
FIG. 11 is a schematic block diagram illustrating PRB pair.

The figures are schematic and simplified for clarity, and they merely show details which are essential to the understanding of the embodiments presented herein, while other details have been left out. Throughout, the same reference numerals are used for identical or corresponding parts or steps.

As part of the developing of the embodiments described herein, a problem will first be identified and discussed. To support enhanced coverage in uplink and downlink data transmissions, the control channel also needs coverage enhancements. As stated above, repetition of the control channel has been proposed as a viable choice to extend or enhance the radio coverage. Note here that "repetition" should be broadly defined, taking into account that the redundancy version of the encoded information message may vary from subframe to subframe. However, a problem with that is that the available control channel resources are not constant over time and are in general different from one subframe to the next. It is then also a problem how to provide repetition of a control channel message over multiple subframes when the available resources are not constant. In other words, assume that a start subframe for PDCCH or EPDCCH repetition is defined, and the PDCCH/

EPDCCH candidate is repeated a number of subframes. Then, it is a problem if the CCE/ECCE resources for that candidate are not present in a subframe where a repetition is intended to occur. This problem occurs due to the fact that the number of available CCE/ECCE is not the same in every repeated subframe as it was in the starting subframe. It is further a problem in EPDCCH if the aggregation level of a candidate is not present in a repeated subframe, which may occur since the set of supported aggregation levels depends on the subframe. In summary, it is thus a problem how to cope with this time varying resources when performing enhanced coverage control channel transmissions through repeated transmission. These issues are addressed by embodiments described herein, which are exemplified and explained in more detail below with reference to the figures.

In short, the embodiments described hereinafter address these issues by adapting the transmission, reception and/or accumulation in one of the following three ways, or in any combination of the following three ways. First, in some embodiments, the subframe is skipped, so neither the receiving node nor the transmitting node is receiving or transmitting a repetition, respectively. Secondly, in some embodiments, the missing, i.e. due to fewer CCE/ECCEs, candidate is skipped, so neither the receiving node nor the transmitting node is receiving or transmitting a repetition of that candidate, respectively. Thirdly, in some embodiments, the subframe that defines the PDCCH or EPDCCH candidates to be repeated is selected so that within the repetition window of Q subframes, it can never happen that the number of CCE/ECCE can be smaller than what the candidate needs. However, it should be noted that it may in some subframes be larger. This may also mean that the candidate defining subframe is different from the "start subframe", i.e. the subframe in the window of Q subframes, with lowest index k.

Figure 12:
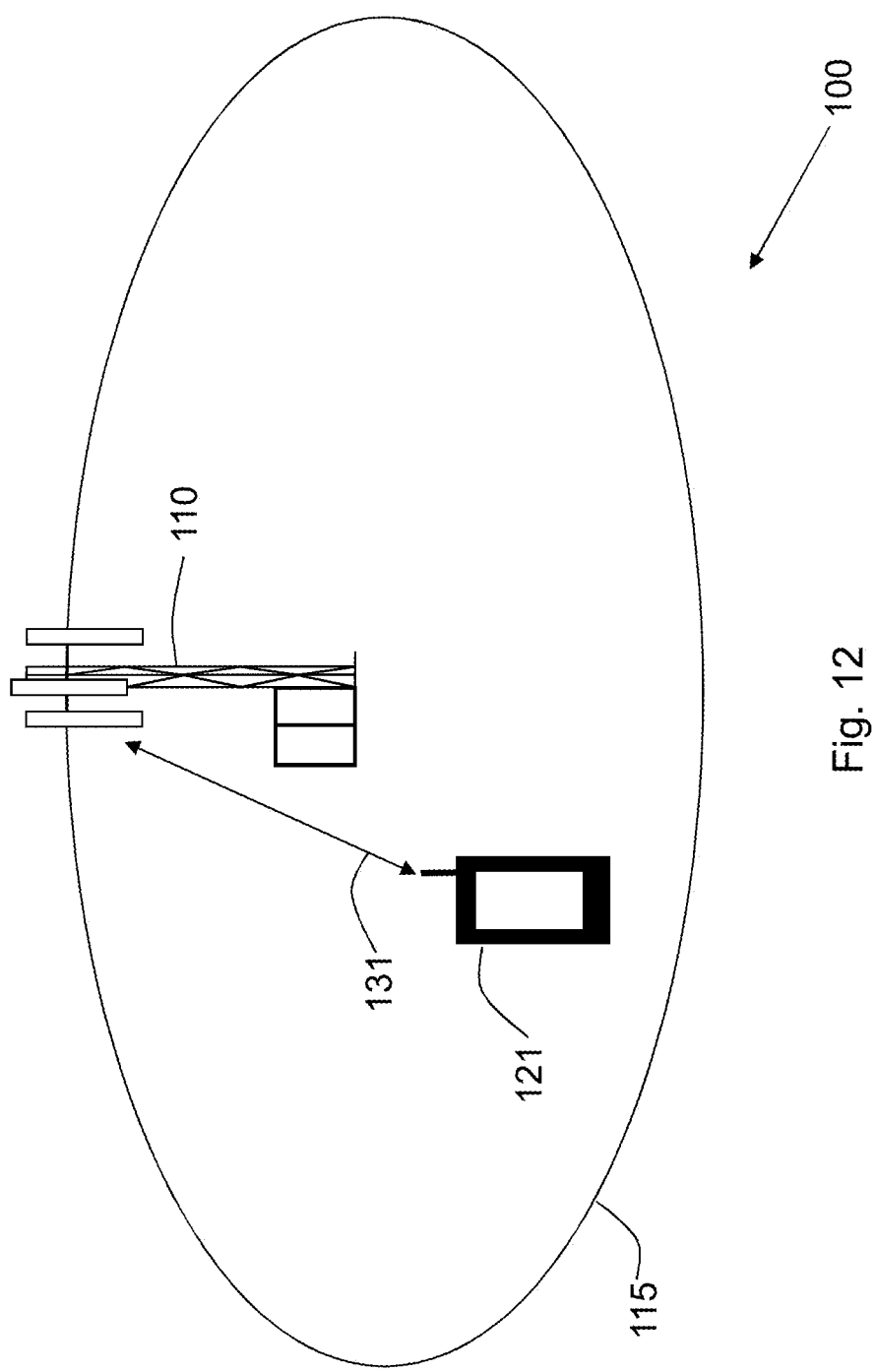
FIG. 12 is a schematic block diagram illustrating embodiments of a transmitting node and a receiving node in a radio communications network.

FIG. 12 depicts a radio communications network 100 in which embodiments herein may be implemented. In some embodiments, the radio communications network 100 may be a wireless communications network such as a Long Term Evolution (LTE), LTE-Advanced, Wideband Code Division Multiple Access (WCDMA), Global System for Mobile communications/Enhanced Data rate for GSM Evolution (GSM/EDGE), Worldwide Interoperability for Microwave Access (WiMax), Ultra Mobile Broadband (UMB) or GSM, or any other similar cellular network or system. The radio communication network 100 is exemplified herein as an LTE network.

The radio communications system 100 comprises a network node 110. The network node 110 serves at least one cell 115. The network node 110 may e.g. be a base station, a radio base station, eNB, eNodeB, a Home Node B, a Home eNode B, femto Base Station (BS), pico BS or any other network unit capable to capable of communicating with a user equipment within the cell served by the network node depending e.g. on the radio access technology and terminology used. The network node 110 may also be e.g. a base station controller, a network controller, a relay node, a repeater, an access point, a radio access point, a Remote Radio Unit (RRU) or a Remote Radio Head (RRH). A cell is a geographical area where radio coverage is provided by radio base station equipment at a base station site or at remote locations in Remote Radio Units (RRU). The cell definition may also incorporate frequency bands and radio access technology used for transmissions, which means that two different cells may cover the same geographical area but using different frequency bands. Each cell is identified by an identity within the local radio area, which is broadcast in the cell. Another identity identifying the cell 115 uniquely in the whole radio communication network 100 is also broadcasted in the cell 115. The network node 110 communicates over the air or radio interface operating on radio frequencies with the UEs within range of the network node 110.

In FIG. 12, a user equipment 121 is located within the cell 115. The UE 121 is configured to communicate within the radio communications network 100 via the network node 110 over a radio link 131 when present in the cell 115 served by the network node 110. The UE 121 may e.g. be any kind of wireless device such as a mobile phone, a cellular phone, a Personal Digital Assistant (PDA), a smart phone, a tablet, a sensor equipped with a UE, Laptop Mounted Equipment (LME) (e.g. USB), Laptop Embedded Equipment (LEE), Machine Type Communication (MTC) device, or Machine to Machine (M2M) device, Customer Premises Equipment (CPE), etc. In the embodiments presented herein, the user equipment 121 may be the transmitting node and the network node 110 may be the receiving node, or vice versa.

First, it may be noted that when either a PDCCH or EPDCCH is used to transmit the control channel information message, such as, e.g. a downlink scheduling assignment or uplink grant, in need of improved radio coverage or additional coverage, repetition of the PDCCH or EPDCCH candidate may be used.

Secondly, in case the subframes are indexed with the variable k and there is a subframe defined, for instance the first subframe in a repetition window of Q subframes, e.g. denoted $k_0$, where the PDCCH or EPDCCH candidates are defined, then according to 3GPP TS 36.213, the following holds for PDCCH:

The set of PDCCH candidates to monitor are defined in terms of search spaces, where a search space $S_k^{(L)}$ at aggregation level $L \in \{1,2,4,8\}$ is defined by a set of PDCCH candidates. For each serving cell on which PDCCH is monitored, the CCEs corresponding to PDCCH candidate m of the search space $S_k^{(L)}$ are given by (Eq. 1)

$$L\{(Y_k+m') \bmod \lfloor N_{CCE,k}/L \rfloor\}+i \qquad \text{(Eq. 1)}$$

where $Y_k$ is defined below, i=0, . . . , L−1. For the common search space m'=m. For the PDCCH UE specific search space, for the serving cell on which PDCCH is monitored, if the monitoring UE is configured with carrier indicator field then $m'=m+M^{(L)} \cdot n_{CI}$ where $n_{CI}$ is the carrier indicator field value, else if the monitoring UE is not configured with carrier indicator field then m'=m, where m=0, . . . , $M^{(L)}$−1. $M^{(L)}$ is the number of PDCCH candidates to monitor in the given search space.

Hence, if the first subframe is the subframes that defines the PDCCH and EPDCCH candidates in the Q subframes k=$k_0$, . . . , $k_{Q-1}$ where the PDCCH is repeated, then the search space is given by $S_{k_0}^{(L)}$. For EPDCCH, there is a corresponding search space equation in 3GPP TS 36.213, Section 9.1.4, which then gives the corresponding search space $ES_{k_0}^{(L)}$ in the Q repeated subframes.

Alternatively, the search space $S_k^{(L)}$ is not fixed during the repetition window of Q subframes. However, to avoid that non-colliding PDCCH candidate in the subframe that defines the candidates will collide in another subframe within the repetition window of Q subframes, receiving nodes may have the same sequence of the search spaces $S_k^{(L)}$ for all subframes k in the repetition window of Q subframes. Since the search space is determined by the parameter $Y_k$ in the search space equation, Eq. 1, transmitting/receiving nodes may be assigned to the same sequence $Y_k$. A way to achieve the same sequence $Y_k$ for the receiving nodes is to assign the same radio network temporary identifier (RNTI) to these receiving nodes since the RNTI determines the sequence $Y_k$. It should here be noted that RNTI is also used for CRC detection, but for that purpose the RNTI should be different among the receiving nodes as to avoid false detection of a scheduling message. Hence, in some embodiments presented below, a receiving node may use one RNTI for sequence determination and another for CRC detection. The PDCCH or EPDCCH candidate m is repeated Q times in Q subframes, and the receiving node is supposed to collect the energy and/or soft information from each candidate m in these Q subframes to get an improved probability to correctly decode the control channel information message. Hence, the transmitting/receiving node accumulates the information separately for each candidate m. Since the PDCCH or EPDCCH is repeated Q times in Q subframes, it may be so that all CCEs or ECCEs of a given candidate m is not present in a subframe due to the fact that the control region size has changed or the PHICH overhead has changed. The latter will take resources from PDCCH. It can also be so that for EPDCCH, the number of candidates of a given aggregation level changes within the Q subframes or the number of ECCE is halved, e.g. as in some special subframes. It may also happen that, in some subframes, there is no EPDCCH transmitted at all for the particular receiving node. For instance, this may occur in some special subframe types, such as, e.g. 0 and 5 for FDD, or if the receiving node has been configured not to monitor EPDCCH in certain subframes.

It is then a general problem of subframes within the Q subframes where the number of CCEs or ECCEs is fewer than what was used in the start subframe, i.e. the subframe among the Q subframes with lowest index k. If this is not handled correctly by the receiving node, the accumulation of information in the repetition will be distorted since the transmitting/receiving node will in such subframe receive noise or interference samples, and coverage will be less than desired.

Example of embodiments of a method performed by a transmitting node 110, 121 for transmitting control channel information repeatedly in a number of subframes, Q, to a receiving node 110, 121 in a radio communication network 100 will now be described with reference to the flowchart depicted in FIG. 13. FIG. 13 illustrates an example of actions or operations which may be taken by the transmitting node 110, 121. It should be noted that the transmitting node may be the user equipment 121 when the receiving node is a network node 110, or the transmitting node may be the network node 110 when the receiving node is the user equipment 121. Each subframe, k, comprises a number, $N_k$, of available control channel elements, e.g. CCE/ECCEs, and a set of control channel candidates, $S_k$.

The control channel candidates in each set of control channel candidates, $S_k$, are determined by the control channel candidates in a set of control channel candidates, $S_{k\_prime}$, in a primary subframe, $k_{prime}$. In other words, this may also be expressed as each set of control channel candidates being defined by a set of control channel candidates in a predefined subframe. The terms "predefined" and "primary" is used interchangeably herein to indicate the defining subframe. The primary subframe, $k_{prime}$, comprises a number, $N_{k\_prime}$, of available control channel elements.

Action 1301

In this action, the transmitting node 110, 121 transmits control channel information of a control channel candidate, m, in a subframe, k, when a start control channel element index of the candidate, m, is smaller than or equal to the number, $N_{k\_prime}$, of available control channel elements in the primary subframe, $k_{prime}$.

Action 1302

Further, when transmitting the control channel information, the transmitting node 110, 121 refrains from transmitting control channel information of the control channel candidate, m, in the subframe, k, when the start control channel element index of the candidate, m, is larger than the number, $N_{k\_prime}$, of available control channel elements in the primary subframe, $k_{prime}$.

In some embodiments, the transmitting node 110, 121 may determine the primary subframe, $k_{prime}$, as the subframe comprising the least number of available control channel elements amongst the number of subframes, Q. In some embodiments, the PDCCH and EPDCCH candidates may be chosen by the transmitting node 110, 121 by selecting the smallest number of control channel elements, e.g. CCE/ECCEs, within the repetition window of Q subframes. For example, when there are special subframes in the repetition window, i.e. there are fewer control channel elements in these subframes, the PDCCH or EPDCCH candidates used for repetition in each of the Q subframes may be selected by the transmitting node 110, 121 by assuming a transmission in that special subframe, i.e. this subframe is used as the primary subframe. In some cases, this may result in that for some subframes there will be more control channel elements than needed, i.e. some control channel elements may not be used by any candidate. This is will however not cause any problems for the existing candidates. Also, in case any of the subframes amongst the number of subframes, Q, comprise Channel State Information Reference Signals, CSI-RS, the transmitting node 110, 121 may determined the control channel candidates in each set of control channel candidates, $S_k$, as if the primary subframe, $k_{prime}$, comprise CSI-RS. Thus, when there are Channel State Information Reference Signals, CSI-RS, present in some of the Q subframes, the PDCCH/EPDCCH candidates for repetition in the Q subframes may be selected by the transmitting node 110, 121 according to some embodiments, assuming that CSI-RS is present in the subframe; that is, even though the first subframe out of the Q subframes does not have CSI-RS. According to these embodiments, it may in this way be ensured that the number of control channel elements can never be smaller than what was used when defining the candidates.

The transmitting node 110, 121 may further refrain from transmitting control channel information of a control channel candidate, m, in a subframe, k, when a last control channel element index of the candidate, m, in the subframe, k, is larger than the number, $N_{k\_prime}$, of available control channel elements in the primary subframe, $k_{prime}$. Following the notation used in the illustrative example of the start control channel element index above, this means that a_0 (m,k) is available but a_(L−1) is larger, so the transmitting node 110, 121 refrains from, or skips/drops, transmitting the control channel information of the candidate. This means that, in some embodiments, the transmitting node 110, 121 may discard the subframes within the Q subframes where the number of control channel elements is larger than compared to the primary subframe that defines the PDCCH/EPDCCH candidates. This means that the transmitting node 110, 121 is not transmitting these candidates, and consequently that the receiving node 110, 121 is not receiving these candidates. In other words, this may be describes as all candidates are skipped in subframes where the number of control channel elements is larger than compared to the primary subframe that defines the PDCCH/EPDCCH candidates. This advantageously avoids contamination of the accumulated control channel information by noise or interference is avoided.

Alternatively, the transmitting node 110, 121 may refrain from transmitting control channel information of all control channel candidates in a subframe, k, when a last control channel element index of any of the candidates, m, in the subframe, k, is larger than the number, $N_{k\_prime}$, of available control channel elements in the primary subframe, $k_{prime}$. This means that the whole subframe is skipped, i.e. no control channel information to any candidate is transmitted in the subframe, if any candidate has a control channel element mapped outside the available control channel elements. In some embodiments, the transmitting node 110, 121 may transmit the control channel information of a control channel candidate, m, in a subframe, k, according to a determined sequence defining the available control channel elements of each control channel candidate, m, in each subframe, k, in the number of subframes, Q, such that the repeated control channel information transmissions of the control channel candidates is able to use different control channel elements indices in different subframes. Furthermore, the transmitting node 110, 121 may transmit the control channel information of a control channel candidate, m, in a subframe, k, when the last control channel element index of the candidate, m, in the subframe, k, is larger than the number, $N_{k\_prime}$, of available control channel elements in the primary subframe, $k_{prime}$, but wherein the control channel candidate, m, is transmitted with less of the available control channel elements in subframe, k, than the number, $N_{k\_prime}$, of available control channel elements in the primary subframe, $k_{prime}$.

Example of embodiments of a method performed by a receiving node 121, 110 for receiving control channel information repeatedly in a number of subframes, Q, from a transmitting node 110, 121 in a radio communication network 100 will now be described with reference to the flowchart depicted in FIG. 14. FIG. 14 illustrates an example of actions or operations which may be taken by the receiving node 121, 110. It should be noted that the receiving node may be a user equipment 121 when the transmitting node is a network node 110, or the receiving node may be a network node 110 when the transmitting node is a user equipment 121.

Each subframe, k, comprises a number, $N_k$, of available control channel elements, e.g. CCE/ECCEs, and a set of control channel candidates, $S_k$. The control channel candidates in each set of control channel candidates, $S_k$, are determined by the control channel candidates in the set of control channel candidates, $S_{k\_prime}$, in a primary subframe, $k_{prime}$. In other words, this may also be expressed as each set of control channel candidates being defined by a set of control channel candidates in a predefined subframe. The terms "predefined" and "primary" may thus be used interchangeably herein to indicate the defining subframe. The primary subframe, $k_{prime}$, comprises a number, $N_{k\_prime}$, of available control channel elements.

Action 1401

In this action, the receiving node 121, 110 receives control channel information of a control channel candidate, m, in a subframe, k, when a start control channel element index, e.g. a CCE/ECCE index, of the candidate, m, is smaller than or equal to the number, $N_{k\_prime}$, of available control channel elements in the primary subframe, $k_{prime}$.

Action 1402

Further, when receiving the control channel information, the receiving node 121, 110 refrains from receiving control channel information of the control channel candidate, m, in the subframe, k, when the start control channel element index of the candidate, m, is larger than the number, $N_{k\_prime}$, of available control channel elements in the primary subframe, $k_{prime}$. Here, it should be noted that the number of control channel elements in subframe k, $N_k$, may be different than the number, $N_{k\_prime}$, of available control channel elements in the primary subframe, $k_{prime}$. Furthermore, the primary subframe, $k_{prime}$, does not necessarily mean the subframe with lowest index, k, or the first subframe in the Q number of subframes, but may be any selected subframe in the number of subframes Q. As an illustrative example of the start control channel element index, each candidate, m, in a subframe, k, may be mapped to a set of control channel elements. The set of control channel elements may be indexed as:

$$a\_0(m,k), a\_1(m,k), \ldots, a\_(L-1)(m,k),$$

whereby L is the aggregation level of the candidate m. Hence, the start control channel element index is here a_0 (m,k). This means that a_0 provides the first or start control channel element index and a_(L−1) gives the last or end control channel element index.

In some embodiments, the receiving node 121, 110 may determine the primary subframe, $k_{prime}$, as the subframe comprising the least number of available control channel elements amongst the number of subframes, Q. For example, this may be expressed mathematically as min (N_k) where the index k runs over all Q subframes. In some embodiments, the PDCCH and EPDCCH candidates may be chosen by the receiving node 121, 110 by selecting the smallest number of control channel elements, e.g. CCE/ECCEs, within the repetition window of Q subframes. For example, when there are special subframes in the repetition window, i.e. there are fewer control channel elements in these subframes, the PDCCH or EPDCCH candidates used for repetition in each of the Q subframes may be selected by the receiving node 121, 110 by assuming a transmission in that special subframe, i.e. this subframe is used as the primary subframe. In some cases, this may result in that for some subframes there will be more control channel elements than needed, i.e. some control channel elements may not be used by any candidate. This is will however not cause any problems for the existing candidates. Also, in case any of the subframes amongst the number of subframes, Q, comprise Channel State Information Reference Signals, CSI-RS, the receiving node 121, 110 may determined the control channel candidates in each set of control channel candidates, $S_k$, as if the primary subframe, $k_{prime}$, comprise CSI-RS. Thus, when there are Channel State Information Reference Signals, CSI-RS, present in some of the Q subframes, the PDCCH/EPDCCH candidates for repetition in the Q subframes may be selected by the receiving node 121, 110, according to some embodiments, assuming that CSI-RS is present in the subframe; that is, even though the first subframe out of the Q subframes does not have CSI-RS. According to these embodiments, it may in this way be ensured that the number of control channel elements can never be smaller than what was used when defining the candidates.

The receiving node 121, 110 may further refrain from receiving control channel information of a control channel candidate, m, in a subframe, k, when a last control channel element index of the candidate, m, in the subframe, k, is larger than the number, $N_{k\_prime}$, of available control channel elements in the primary subframe, $k_{prime}$. Following the notation used in the illustrative example of the start control channel element index above, this means that a_0(m,k) is available but a_(L−1) is larger, so the receiving node 121, 110 refrains from, or skips/drops, receiving the control channel information of the candidate. This means that, in some embodiments, the receiving node 121, 110 may discard the subframes within the Q subframes where the number of control channel elements is larger than compared to the primary subframe that defines the PDCCH/EPDCCH candidates. This means that as the transmitting node 110, 121 is not transmitting these candidates, the receiving node 110, 121 will not receive these candidates. In other words, this may be describes as all candidates are skipped in subframes where the number of control channel elements is larger than compared to the primary subframe that defines the PDCCH/EPDCCH candidates. This advantageously avoids contamination of the accumulated control channel information by noise or interference is avoided.

Alternatively, the receiving node 121, 110 may refrain from receiving control channel information of all control channel candidates in a subframe, k, when a last control channel element index of the candidate, m, in the subframe, k, is larger than the number, $N_{k\_prime}$, of available control channel elements in the primary subframe, $k_{prime}$. This means that the whole subframe is skipped, i.e. no control channel information to any candidate is received in the subframe, if any candidate has a control channel element mapped outside the available control channel elements. In some embodiments, the receiving node 121, 110 may receive the control channel information of a control channel candidate, m, in a subframe, k, according to a determined sequence defining the available control channel elements of each control channel candidate, m, in each subframe, k, in the number of subframes, Q, such that the repeated control channel information transmissions of the control channel candidates is able to use different control channel elements indices in different subframes. Furthermore, the receiving node 121, 110 may receive the control channel information of a control channel candidate, m, in a subframe, k, when the last control channel element index of the candidate, m, in the subframe, k, is larger than the number, $N_{k\_prime}$, of available control channel elements in the primary subframe, $k_{prime}$, but wherein the control channel candidate, m, is transmitted with less of the available control channel elements in subframe, k, than the number, $N_{k\_prime}$, of available control channel elements in the primary subframe, $k_{prime}$.

Figure 15:
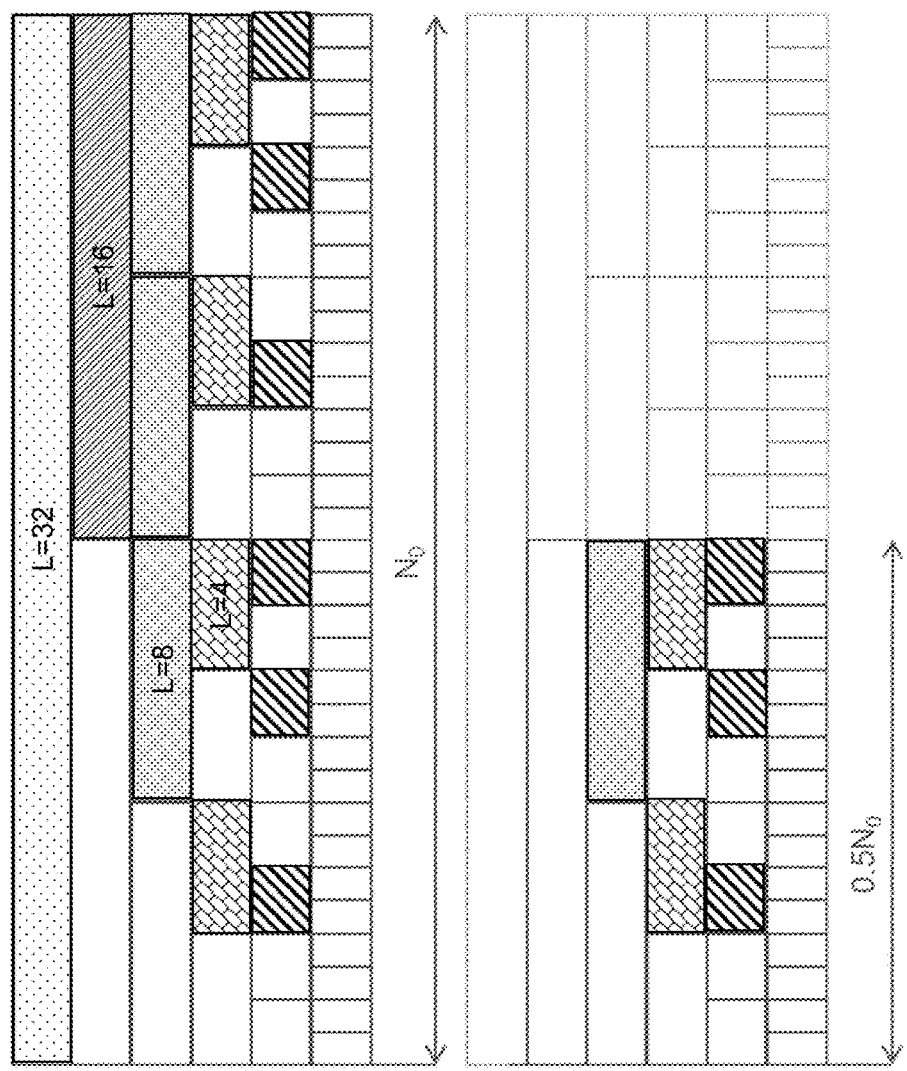
FIG. 15 is a schematic illustration depicting embodiments of transmitting and receiving nodes.

In some embodiments, in subframes with fewer control channel elements than the primary subframe that defines the PDCCH/EPDCCH candidates to be repeated, the transmitting node 110, 121 and/or receiving node 121, 110 only skips, refrains from transmitting/receiving or drops, the candidates where the candidate maps to at least one of its control channel element indices that is larger than the maximum number of control channel elements in the primary subframe. An example of this is illustrated in FIG. 15.

In some embodiments, a predetermined sequence that defines the search space, i.e. the control channel elements belonging to each PDCCH or EPDCCH candidate m, respectively, may be known to both the transmitting node 110, 121 and receiving node 121, 110. This predetermined sequence may be configured so as to cause the repeated PDCCH/EPDCCH transmissions to be mapped to different control channel element indices in different subframes. Advantageously, in this way, e.g. if control channel elements are discarded at several occasions within the window of Q subframes, it is likely that the discarded control channel elements are associated with transmissions to different receiving nodes, thereby improving the fairness between the receiving nodes 121, 110. Furthermore, in some embodiments, all receiving nodes 121, 110 may share the same determined sequence. In some embodiments, this may be accomplished by using a common sequence $Y_k$ in the search space equation for all receiving nodes in a cell. This has the additional advantage that two PDCCH/EPDCCH candidates are mapped to non-overlapping control channel elements in every subframe within the repetition window of Q subframes, and thus advantageously will avoid collision. In some embodiments, the receiving node 121, 110 may assume that the PCFICH value, i.e. the number of OFDM control symbols, does not change in the Q subframes. This means that the number of control channel elements is not changed in case of FDD operation, since there are no special subframes. In this case, transmitting node 110, 1221, e.g. network node 110, may ensure that the PCFICH value is actually unchanged during such repetition window of Q subframes, i.e. the transmitting node 110, 121 disables the dynamic adaptation of the control region size.

Figure 16:
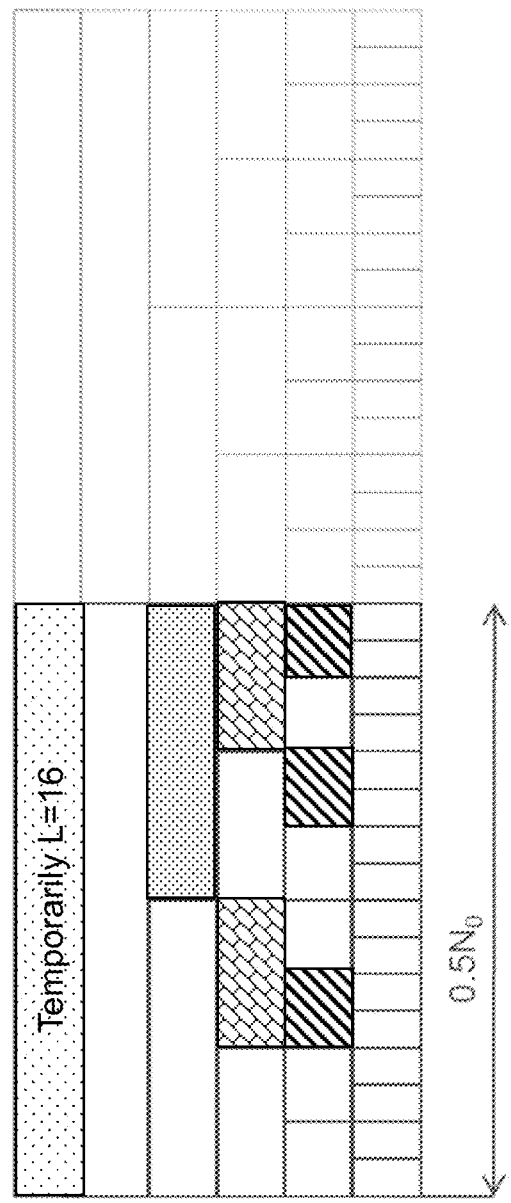
FIG. 16 is a schematic illustration depicting embodiments of transmitting and receiving nodes.

In some embodiments, the transmitting node 110, 121 may, when a PDCCH/EPDCCH candidate have fewer control channel elements than in the primary subframe but still a positive number of control channel elements, use the remaining control channel elements for transmitting the control channel information of that candidate. Hence, the rate matching in the transmitting node 110, 121 of a given candidate of a given aggregation level is temporarily rate matched to a smaller aggregation level. With this being known by the receiving node 110, 121, the receiving node 110, 121 may continue to accumulate the information also using this subframe in a corresponding way. An example of this is illustrated in FIG. 16.

In accordance with one aspect of the embodiments herein, these may also be described as part of a method in a control channel, e.g. CCH, coverage enhanced transmission obtained by transmitting/receiving/accumulating control channel information provided over Q subframes, where the number of available control channel elements in subframe k is $N_k$ and the set of control channel candidates in subframe k is $S_k$ and where the control channel candidates for repetition are determined from a predefined subframe $k_{prime}$, with $N_{kprime}$ available control channel elements. This method comprising transmitting, or receiving/accumulating, a control channel candidate, m, information in a subframe, k, if the start control channel element index of the candidate m defined in subframe $k_{prime}$ is smaller than or equal to $N_k$ and skipping the transmitting, or receiving/accumulation, of a control channel candidate m information in a subframe k if the start control channel element index of the candidate m is larger than Nk. In accordance with a further aspect of the embodiments herein, the control channel candidate m information in a subframe k is skipped if the last control channel element index of the candidate m in that subframe is larger than $N_k$. In accordance with yet a further aspect of the embodiments herein, all the control channel candidates in a subframe k are skipped if the last control channel element index of any of the candidates m in that subframe is larger than $N_k$. In accordance with yet a further aspect of the embodiments herein, the control channel candidate m information in a subframe k is accumulated if the start control channel element index of the candidate m is smaller than or equal to $N_k$ and the last control channel element index of the candidate m in that subframe k is larger than $N_k$ wherein said candidate m is transmitted/received with fewer control channel elements in subframe k than in the defining subframe $k_{prime}$. In accordance with yet a further aspect of the embodiments herein, the subframe $k_{prime}$ is determined as the subframe with the smallest number of available control channel element, $N_k$, within the repetition window of Q subframes.

To perform the method actions herein a user equipment 121 and a network node 110 is provided. FIG. 17 is a block diagram depicting the user equipment 121 and the network node 110. The user equipment 121 is configured to perform the methods related to a transmitting node and/or to the receiving node according to embodiments herein. The network node 110 is also configured to perform the methods related to a transmitting node and/or to the receiving node according to embodiments herein.

The embodiments herein for transmitting and/or receiving control channel information repeatedly in a number of subframes in a radio communication network 100 may be implemented through one or more processors 1710 in the user equipment 121 depicted in FIG. 17, together with computer program code for performing the functions and/or method actions of the embodiments herein. The program code mentioned above may also be provided as a computer program product, for instance in the form of a data carrier carrying computer program code for performing embodiments herein when being loaded into the user equipment 121. One such carrier may be in the form of a CD ROM disc. It is however feasible with other data carriers such as a memory stick. The computer program code may furthermore be provided as pure program code on a server and downloaded to the user equipment 121. The user equipment 121 comprises a transmitter TX and a receiver RX, or a transceiver 1720, over which the user equipment 121 may transmit and/or receive control channel information transmissions to and/or from the network node 110. The user equipment 121 further comprises a memory 1730. The memory 1730 may, for example, be used to accumulate and store control channel information and/or applications to perform the methods herein, etc.

The user equipment 121 is configured to, e.g. by means of the one or more processors 1710 and/or transceiver 1720 being configured to, transmit and/or receive control channel information of a control channel candidate in a subframe when a start control channel element index of the control channel candidate is smaller than or equal to the number of available control channel elements, in the predefined subframe. Also, the user equipment 121 is configured to, e.g. by means of the one or more processors 1710 and/or transceiver 1720 being configured to, refrain from transmitting and/or receiving control channel information of a control channel candidate in a subframe when the start control channel element index of the control channel candidate is larger than the number of available control channel elements in the predefined subframe.

Here, the predefined subframe may be determined as the subframe comprising the least number of available control channel elements amongst the number of subframes. Also, in case any of the subframes amongst the number of subframes comprise Channel State Information Reference Signals, CSI-RS, the control channel candidates in each set of control channel candidates may be determined as if the predefined subframe were to comprise the CSI-RS.

In some embodiments, the user equipment 121 may be configured to, e.g. by means of the one or more processors 1710 and/or transceiver 1720 being configured to, refrain from transmitting and/or receiving control channel information of a control channel candidate in a subframe when a last control channel element index of the candidate in the subframe is larger than the number of available control channel elements in the predefined subframe. Furthermore, in some embodiments, the user equipment 121 may be configured to, e.g. by means of the one or more processors 1710 and/or transceiver 1720 being configured to, refrain from transmitting and/or receiving control channel information of all control channel candidates in a subframe when a last control channel element index of the candidate in the subframe is larger than the number of available control channel elements in the predefined subframe.

In some embodiments, the user equipment 121 may be configured to, e.g. by means of the one or more processors 1710 and/or transceiver 1720 being configured to, transmit and/or receive the control channel information of a control channel candidate in a subframe according to a determined sequence defining the available control channel elements of each control channel candidate in each subframe in the number of subframes such that the repeated control channel information transmissions of the control channel candidates is able to use different control channel elements indices in different subframes. Also, in some embodiments, the user equipment 121 may be configured to, e.g. by means of the one or more processors 1710 and/or transceiver 1720 being configured to, transmit and/or receive the control channel information of a control channel candidate in a subframe when the last control channel element index of the candidate in the subframe is larger than the number of available control channel elements in the primary subframe but wherein the control channel candidate is transmitted with less of the available control channel elements in subframe than the number of available control channel elements in the predefined subframe.

The embodiments herein for transmitting and/or receiving control channel information repeatedly in a number of subframes in a radio communication network 100 may be implemented through one or more processors 1810 in the network node 110 depicted in FIG. 18, together with computer program code for performing the functions and/or method actions of the embodiments herein. The program code mentioned above may also be provided as a computer program product, for instance in the form of a data carrier carrying computer program code for performing embodiments herein when being loaded into the network node 110. One such carrier may be in the form of a CD ROM disc. It is however feasible with other data carriers such as a memory stick. The computer program code may furthermore be provided as pure program code on a server and downloaded to the network node 110. The network node 110 comprises a transmitter TX and a receiver RX, or a transceiver 1820, over which the network node 110 may transmit or receive control channel information transmissions to or from the user equipment 121. The network node 110 further comprises a memory 1830. The memory 1830 may, for example, be used to accumulate and store control channel information and/or applications to perform the methods herein etc. The network node 110 may comprise an input/output interface 1840, which may be used to communicate with other radio network entities or nodes in a core network of the radio communications network 100.

The network node 110 is configured to, e.g. by means of the one or more processors 1810 and/or transceiver 1820 being configured to, transmit and/or receive control channel information of a control channel candidate in a subframe when a start control channel element index of the control channel candidate is smaller than or equal to the number of available control channel elements, in the predefined subframe. Also, the network node 110 is configured to, e.g. by means of the one or more processors 1810 and/or transceiver 1820 being configured to, refrain from transmitting and/or receiving control channel information of a control channel candidate in a subframe when the start control channel element index of the control channel candidate is larger than the number of available control channel elements in the predefined subframe.

Here, the predefined subframe may be determined as the subframe comprising the least number of available control channel elements amongst the number of subframes. Also, in case any of the subframes amongst the number of subframes comprise Channel State Information Reference Signals, CSI-RS, the control channel candidates in each set of control channel candidates may be determined as if the predefined subframe were to comprise the CSI-RS.

In some embodiments, the network node 110 may be configured to, e.g. by means of the one or more processors 1810 and/or transceiver 1820 being configured to, refrain from transmitting and/or receiving control channel information of a control channel candidate in a subframe when a last control channel element index of the candidate in the subframe is larger than the number of available control channel elements in the predefined subframe. Furthermore, in some embodiments, the network node 110 may be configured to, e.g. by means of the one or more processors 1810 and/or transceiver 1820 being configured to, refrain from transmitting and/or receiving control channel information of all control channel candidates in a subframe when a last control channel element index of the candidate in the subframe is larger than the number of available control channel elements in the predefined subframe.

In some embodiments, the network node 110 may be configured to, e.g. by means of the one or more processors 1810 and/or transceiver 1820 being configured to, transmit and/or receive the control channel information of a control channel candidate in a subframe according to a determined sequence defining the available control channel elements of each control channel candidate in each subframe in the number of subframes such that the repeated control channel information transmissions of the control channel candidates is able to use different control channel elements indices in different subframes. Also, in some embodiments, the network node 110 may be configured to, e.g. by means of the one or more processors 1810 and/or transceiver 1820 being configured to, transmit and/or receive the control channel information of a control channel candidate in a subframe when the last control channel element index of the candidate in the subframe is larger than the number of available control channel elements in the primary subframe but wherein the control channel candidate is transmitted with less of the available control channel elements in subframe than the number of available control channel elements in the predefined subframe.

As will be readily understood by those familiar with communications design, that functions from other circuits may be implemented using digital logic and/or one or more microcontrollers, microprocessors, or other digital hardware. In some embodiments, several or all of the various functions may be implemented together, such as in a single application-specific integrated circuit (ASIC), or in two or more separate devices with appropriate hardware and/or software interfaces between them. Several of the functions may be implemented on a processor shared with other functional components of a wireless terminal or network node, for example.

Alternatively, several of the functional elements of processing circuits discussed may be provided through the use of dedicated hardware, while others are provided with hardware for executing software, in association with the appropriate software or firmware. Thus, the term "processor" or "controller" as used herein does not exclusively refer to hardware capable of executing software and may implicitly include, without limitation, digital signal processor (DSP) hardware, read-only memory (ROM) for storing software, random-access memory for storing software and/or program or application data, and non-volatile memory. Other hardware, conventional and/or custom, may also be included. Designers of communications receivers will appreciate the cost, performance, and maintenance trade-offs inherent in these design choices. The different actions taken by the different nodes may be implemented with different circuits.

It should be noted that although terminology from 3GPP LTE has been used herein in order to exemplify some of the embodiments, this should not be seen as limiting to only the aforementioned system. As previously mentioned, other wireless systems, including WCDMA, WiMax, UMB and GSM, may also benefit from exploiting the ideas covered by the embodiments described herein.

Also note that terminology such as eNodeB and UE should be considering non-limiting and does in particular not imply a certain hierarchical relation between the two; in general "eNodeB" could be considered as first device or node and "UE" as a second device or node, and these two devices or nodes communicate with each other over some radio channel. Herein, we also focus on wireless control channel transmissions in the downlink, but the embodiments described herein are equally applicable in the uplink.

The terminology used in the detailed description of the particular exemplary embodiments illustrated in the accompanying drawings is not intended to be limiting of the described transmitting and receiving nodes, i.e. user equipments 121 and network nodes 110, and methods therein.

As used herein, the term "and/or" comprises any and all combinations of one or more of the associated listed items.

Further, as used herein, the common abbreviation "e.g.", which derives from the Latin phrase "exempli gratia," may be used to introduce or specify a general example or examples of a previously mentioned item, and is not intended to be limiting of such item. If used herein, the common abbreviation "i.e.", which derives from the Latin phrase "id est," may be used to specify a particular item from a more general recitation. The common abbreviation "etc.", which derives from the Latin expression "et cetera" meaning "and other things" or "and so on" may have been used herein to indicate that further features, similar to the ones that have just been enumerated, exist.

As used herein, the singular forms "a", "an" and "the" are intended to comprise also the plural forms as well, unless expressly stated otherwise. It will be further understood that the terms "includes," "comprises," "including" and/or "comprising," when used in this specification, specify the presence of stated features, actions, integers, steps, operations, elements, and/or components, but do not preclude the presence or addition of one or more other features, actions, integers, steps, operations, elements, components, and/or groups thereof.

Unless otherwise defined, all terms comprising technical and scientific terms used herein have the same meaning as commonly understood by one of ordinary skill in the art to which the described embodiments belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

The embodiments herein are not limited to the above described preferred embodiments. Various alternatives, modifications and equivalents may be used. Therefore, the above embodiments should not be construed as limiting.

The invention claimed is:

1. A method performed by a transmitting node for transmitting control channel information repeatedly in a number of subframes to a receiving node in a radio communication network, each subframe comprising a number of available control channel elements and a set of control channel candidates, and each set of control channel candidates being defined by a set of control channel candidates in a predefined subframe comprising a number of available control channel elements, the method comprising:
   transmitting control channel information of a control channel candidate in a subframe when a start control channel element index of the control channel candidate is one of smaller than and equal to the number of available control channel elements in the predefined subframe, the predefined subframe being determined as the subframe comprising the least number of available control channel elements amongst the number of subframes; and
   refraining from transmitting control channel information of a control channel candidate in a subframe when the start control channel element index of the control channel candidate is larger than the number of available control channel elements in the predefined subframe.

2. The method according to claim 1, wherein, in case any of the subframes amongst the number of subframes comprise Channel State Information Reference Signals (CSI-RS) the control channel candidates in each set of control channel candidates are determined as if the predefined subframe were to comprise CSI-RS.

3. The method according to claim 1, wherein the refraining further comprises refraining from transmitting control channel information of a control channel candidate in a subframe when a last control channel element index of the control channel candidate in the subframe is larger than the number of available control channel elements in the predefined subframe.

4. The method according to claim 1, wherein the refraining further comprises refraining from transmitting control channel information of all control channel candidates in a subframe when a last control channel element index of the control channel candidate in the subframe is larger than the number of available control channel elements in the predefined subframe.

5. The method according to claim 1, wherein the transmitting further comprises transmitting the control channel information of a control channel candidate in a subframe according to a determined sequence defining the available control channel elements of each control channel candidate in each subframe in the number of subframes such that the repeated control channel information transmissions of the control channel candidates is able to use different control channel elements indices in different subframes.

6. The method according to claim 1, wherein the transmitting further comprises transmitting the control channel information of a control channel candidate in a subframe when the last control channel element index of the control channel candidate in the subframe is larger than the number of available control channel elements in the predefined subframe but wherein the control channel candidate is transmitted with less of the available control channel elements in subframe than the number of available control channel elements in the predefined subframe.

7. The method according to claim 1, wherein the transmitting node is one of a user equipment and a network node, and the receiving node is the other of the network node and the user equipment.

8. A transmitting node for transmitting control channel information repeatedly in a number of subframes to a receiving node in a radio communication network, each subframe comprising a number of available control channel elements and a set of control channel candidates, and each set of control channel candidates is defined by a set of control channel candidates in a predefined subframe comprising a number of available control channel elements, the transmitting node being configured to:
   transmit control channel information of a control channel candidate in a subframe when a start control channel element index of the control channel candidate is one of smaller than and equal to the number of available control channel elements, in the predefined subframe, the predefined subframe being determined as the subframe comprising the least number of available control channel elements amongst the number of subframes, and to refrain from transmitting control channel information of a control channel candidate in a subframe when the start control channel element index of the control channel candidate is larger than the number of available control channel elements in the predefined subframe.

9. The transmitting node according to claim 8, wherein, in case any of the subframes amongst the number of subframes comprise Channel State Information Reference Signals (CSI-RS) the control channel candidates in each set of control channel candidates are determined as if the predefined subframe were to comprise CSI-RS.

10. The transmitting node according to claim 8, further configured to refrain from transmitting control channel information of a control channel candidate in a subframe when a last control channel element index of the control channel candidate in the subframe is larger than the number of available control channel elements in the predefined subframe.

11. The transmitting node according to claim 8, further configured to refrain from transmitting control channel information of all control channel candidates in a subframe when a last control channel element index of the control channel candidate in the subframe is larger than the number of available control channel elements in the predefined subframe.

12. The transmitting node according to claim 8, further configured to transmit the control channel information of a control channel candidate in a subframe according to a determined sequence defining the available control channel elements of each control channel candidate in each subframe in the number of subframes such that the repeated control channel information transmissions of the control channel candidates is able to use different control channel elements indices in different subframes.

13. The transmitting node according to claim 8, further configured to transmit the control channel information of a control channel candidate in a subframe when the last control channel element index of the control channel candidate in the subframe is larger than the number of available control channel elements in the predefined subframe but wherein the control channel candidate is transmitted with less of the available control channel elements in subframe than the number of available control channel elements in the predefined subframe.

14. A method performed by a receiving node for receiving control channel information repeatedly in a number of subframes from a transmitting node in a radio communication network, each subframe comprising a number of available control channel elements and a set of control channel candidates, and each set of control channel candidates being defined by a set of control channel candidates in a predefined subframe comprising a number of available control channel elements, the method comprising:

receiving control channel information of a control channel candidate in a subframe when a start control channel element index of the control channel candidate is one of smaller than and equal to the number of available control channel elements in the predefined subframe, the predefined subframe being determined as the subframe comprising the least number of available control channel elements amongst the number of subframes; and refraining from receiving control channel information of a control channel candidate in a subframe when the start control channel element index of the control channel candidate is larger than the number of available control channel elements in the predefined subframe.

15. The method according to claim 14, wherein, in case any of the subframes amongst the number of subframes comprise Channel State Information Reference Signals (CSI-RS) the control channel candidates in each set of control channel candidates are determined as if the predefined subframe were to comprise CSI-RS.

16. The method according to claim 14, wherein the refraining further comprises refraining from receiving control channel information of a control channel candidate in a subframe when a last control channel element index of the control channel candidate in the subframe is larger than the number of available control channel elements in the predefined subframe.

17. The method according to claim 14, wherein the refraining further comprises refraining from receiving control channel information of all control channel candidates in a subframe when a last control channel element index of the control channel candidate in the subframe is larger than the number of available control channel elements in the predefined subframe.

18. The method according to claim 14, wherein the receiving further comprises receiving the control channel information of a control channel candidate in a subframe according to a determined sequence defining the available control channel elements of each control channel candidate in each subframe in the number of subframes such that the repeated control channel information receptions of the control channel candidates uses different control channel elements indices in different subframes.

19. The method according to claim 14, wherein the receiving further comprises receiving the control channel information of a control channel candidate in a subframe when the last control channel element index of the control channel candidate in the subframe is larger than the number of available control channel elements in the predefined subframe but wherein the control channel candidate is received with less of the available control channel elements in subframe than the number of available control channel elements in the predefined subframe.

20. The method according to claim 14, wherein the receiving node is one of a network node and a user equipment, and the transmitting node is the other of the user equipment and the network node.

21. A receiving node for receiving control channel information repeatedly in a number of subframes from a transmitting node in a radio communication network, each subframe comprising a number of available control channel elements and a set of control channel candidates, and each set of control channel candidates being defined by a set of control channel candidates in a predefined subframe comprising a number of available control channel elements, the receiving node being configured to:

receive control channel information of a control channel candidate in a subframe when a start control channel element index of the control channel candidate is one of smaller than and equal to the number of available control channel elements, in the predefined subframe, and refrain from receiving control channel information of a control channel candidate in a subframe when the start control channel element index of the control channel candidate is larger than the number of available control channel elements in the predefined subframe; and determine the predefined subframe as the subframe comprising the least number of available control channel elements amongst the number of subframes.

22. The receiving node according to claim 21, further configured to determine, in case any of the subframes amongst the number of subframes comprise Channel State Information Reference Signals (CSI-RS) the control channel candidates in each set of control channel candidates as if the predefined subframe were to comprise CSI-RS.

23. The receiving node according to claim 21, further configured to refrain from receiving control channel information of a control channel candidate in a subframe when a last control channel element index of the control channel candidate in the subframe is larger than the number of available control channel elements in the predefined subframe.

24. The receiving node according to claim 21, further configured to refrain from receiving control channel information of all control channel candidates in a subframe when a last control channel element index of the control channel candidate in the subframe is larger than the number of available control channel elements in the predefined subframe.

25. The receiving node according to claim 21, further configured to receive the control channel information of a control channel candidate in a subframe according to a determined sequence defining the available control channel elements of each control channel candidate in each subframe in the number of subframes such that the repeated control channel information receptions of the control channel candidates uses different control channel elements indices in different subframes.

26. The receiving node according to claim 21, further configured to receive the control channel information of a control channel candidate in a subframe when the last control channel element index of the control channel candidate in the subframe is larger than the number of available control channel elements in the predefined subframe but wherein the control channel candidate is received with less of the available control channel elements in subframe than the number of available control channel elements in the predefined subframe.

* * * * *